US011936086B2

(12) United States Patent
Manzoni et al.

(10) Patent No.: US 11,936,086 B2
(45) Date of Patent: Mar. 19, 2024

(54) WIDE BANDWIDTH FOLDED METALLIZED DIELECTRIC WAVEGUIDE FILTERS

(71) Applicant: COMMSCOPE ITALY S.R.L., Agrate Brianza (IT)

(72) Inventors: Andrea Manzoni, Missaglia (IT); Giuseppe Resnati, Seregno (IT); Kejia Cao, Lecco (IT); Daniele Marrelli, Carnate (IT)

(73) Assignee: CommScope Italy S.r.l., Agrate Brianza (IT)

( * ) Notice: Subject to any disclaimer, the term of this patent is extended or adjusted under 35 U.S.C. 154(b) by 82 days.

(21) Appl. No.: 17/637,296

(22) PCT Filed: Sep. 17, 2020

(86) PCT No.: PCT/EP2020/076046
§ 371 (c)(1),
(2) Date: Feb. 22, 2022

(87) PCT Pub. No.: WO2021/058378
PCT Pub. Date: Apr. 1, 2021

(65) Prior Publication Data

US 2022/0285810 A1 Sep. 8, 2022

Related U.S. Application Data

(60) Provisional application No. 62/903,125, filed on Sep. 20, 2019.

(30) Foreign Application Priority Data

Aug. 7, 2020 (IT) ........................ 102020000019711

(51) Int. Cl.
*H01P 1/208* (2006.01)
*H01P 1/20* (2006.01)

(52) U.S. Cl.
CPC .......... *H01P 1/2088* (2013.01); *H01P 1/2002* (2013.01)

(58) Field of Classification Search
CPC ........ H01P 1/2002; H01P 1/2088; H01P 1/20; H01P 1/201; H01P 1/207; H01P 1/208; H01P 3/16
See application file for complete search history.

(56) References Cited

U.S. PATENT DOCUMENTS

| | | |
|---|---|---|
| 5,812,036 A | 9/1998 | Estrada |
| 6,104,262 A | 8/2000 | Kich |

(Continued)

FOREIGN PATENT DOCUMENTS

| | | |
|---|---|---|
| WO | 2014085383 A1 | 6/2014 |
| WO | 2017004417 A1 | 1/2017 |
| WO | 2019076456 A1 | 4/2019 |

OTHER PUBLICATIONS

"International Search Report and Written Opinion corresponding to International Patent Application No. PCT/EP2020/076046, dated Jan. 26, 2021".

(Continued)

*Primary Examiner* — Stephen E. Jones
(74) *Attorney, Agent, or Firm* — Myers Bigel, P.A.

(57) ABSTRACT

A metallized dielectric waveguide filter includes an upper metallized dielectric waveguide having a plurality of upper resonant cavities, the upper metallized dielectric waveguide comprising an upper dielectric block having metallized outer walls, and a lower metallized dielectric waveguide having a plurality of lower resonant cavities, the lower metallized dielectric waveguide comprising a lower dielectric block having metallized outer walls. A first of the upper resonant cavities is operatively connected to a first of the lower resonant cavities via at least one coupling window. A first (Continued)

slot having metallized walls is provided in a portion of the upper dielectric block that is part of the first of the upper resonant cavities.

20 Claims, 18 Drawing Sheets

(56) References Cited

U.S. PATENT DOCUMENTS

| | | | | |
|---|---|---|---|---|
| 10,236,550 | B2 | 3/2019 | Tamiazzo et al. | |
| 2014/0077900 | A1 * | 3/2014 | Rogozine | H01P 1/2088 333/212 |
| 2016/0094265 | A1 * | 3/2016 | Yuan | H01P 1/213 333/202 |
| 2016/0336632 | A1 | 11/2016 | Rogozine et al. | |
| 2020/0411935 | A1 * | 12/2020 | Jing | H01P 1/2088 |

OTHER PUBLICATIONS

Accatino, L. , et al., "A compact waveguide filtering structure with transmission zeros for multi-beam satellites", 2017 IEEE MTT-S International Microwave Symposium (IMS), Honolulu, HI, Jun. 2017, pp. 737-740.

Ghorbaninejad, H. , et al., "Compact Bandpass Filters Utilizing Dielectric Filled Waveguides", Progress in Electromagnetics Research B, vol. 7, Apr. 4, 2008, pp. 105-115.

Hopfer, Samuel , "The Design of Ridged Waveguides", IRE Transactions—Microwave Theory and Techniques, vol. 3, Issue 5, Oct. 1955, pp. 20-29.

Rauscher, Christen , "Design of Dielectric-Filled Cavity Filters With Ultrawide Stopband Characteristics", IEEE Transactions on Microwave Theory and Techniques, vol. 53, No. 5, May 2005, 1777-1786.

Ruiz-Cruz, Jorge A., et al., "Ultra-Wideband LTCC Ridge Waveguide Filters", IEEE Microwave and Wireless Components Letters, vol. 17, No. 2, Feb. 2007, pp. 115-117.

Sandhu, Muhammad , et al., "Miniaturized Dielectric Waveguide Filters", International Journal of Electronics, vol. 103, No. 10, Feb. 2, 2016, pp. 1776-1787.

Tornielli Di Crestvolant, Vittorio, et al., "Dimensional Synthesis of Evanescent-Mode Ridge Waveguide Bandpass Filters", IEEE Transactions on Microwave Theory and Techniques, vol. 66, No. 2, Feb. 2018, pp. 954-961.

Yao, Hui-Wen , et al., "Quarter Wavelength Ceramic Combline Filters", IEEE Transactions on Microwave Theory and Techniques, vol. 44, No. 12, Dec. 1996, pp. 2673-2679.

* cited by examiner

| Coupling sign \ Coupling direction | Horizontal | Vertical |
| --- | --- | --- |
| Positive | $k_{1,2}$ $k_{5,6}$<br>$k_{2,3}$ $k_{6,7}$<br>$k_{3,4}$ $k_{8,9}$ | $k_{4,5}$<br>$k_{2,7}$ |
| Negative | --- | $k_{3,6}$ |

WIDE BANDWIDTH FOLDED METALLIZED DIELECTRIC WAVEGUIDE FILTERS

CROSS-REFERENCE TO RELATED APPLICATIONS

The present application is a 35 U.S.C. § 371 national stage application of PCT Application No. PCT/EP2020/076046, filed on Sep. 17, 2020, which itself claims priority to Italian Patent Application No. 102020000019711, filed Aug. 7, 2020 and under 35 U.S.C. § 119 to U.S. Provisional Patent Application Ser. No. 62/903,125, filed Sep. 20, 2019, the entire contents of all of which are incorporated herein by reference as if set forth fully herein in their entireties.

FIELD

The present invention relates generally to communications systems and, more particularly, to filters that are suitable for use in cellular communications systems.

BACKGROUND

Filters are electronic devices that selectively pass signals based on the frequency of the signal. Various different types of filters are used in cellular communications systems. Moreover, as new generations of cellular communications services have been introduced—typically without phasing out existing cellular communications services—both the number and types of filters that are used has expanded significantly. Filters may be used, for example, to allow radio frequency ("RF") signals in different frequency bands to share selected components of a cellular communications system and/or to separate RF data signals from power and/or control signals. As the number of filters used in a typical cellular communications system has proliferated, the need for smaller, lighter and/or less expensive filters has increased.

Conventionally, metal resonant cavity filters have been used to implement many of the filters used in cellular communications systems. As shown in FIG. 1A, in its simplest form, a metal resonant cavity filter 10 may consist of a metallic housing 12 that has walls 14 formed therein that define a row of cavities 18-1 through 18-4. While the example filter 10 illustrated in FIG. 1A includes a total of four cavities 18, it will be appreciated that any appropriate number of cavities 18 may be provided as necessary to provide a filter having desired filtering characteristics. Note that herein when multiple of the same elements or structures are provided, they may be referred to in some instances using two part reference numerals, where the two parts are separated by a dash. Herein, such elements may be referred to individually by their full reference numeral (e.g., cavity 18-2) and may be referred to collectively by the first part of the applicable reference numeral (e.g., the cavities 18).

Still referring to FIG. 1A, a coaxial resonating element or "resonator" 20-1 through 20-4 may be provided in each of the respective cavities 18-1 through 18-4. The walls 14 may include openings or "windows" 16 that allow resonators 20 in adjacent ones of the cavities 18 to couple to each other along a main coupling path that extends from an input 22 to an output 24 of the filter 10. These coupled resonances may form a filter having a pass-band response with no transmission zeros and a moderate fractional bandwidth (e.g., a bandwidth of up to 10-20% of the center frequency of the pass-band, depending on the specific geometry and size of the cavities and resonators).

When wider bandwidths are required it is possible to invert the orientation of every other coaxial resonator 20. A filter 30 having this configuration is shown in FIG. 1B. In filter 30, the electric and magnetic components of the couplings between adjacent resonators 20 add in phase, and hence the total amount of coupling can be increased. As the bandwidth of a filter is proportional to the total amount of coupling, the filter 30 of FIG. 1B may have increased bandwidth as compared to filter 10 of FIG. 1A.

The "response" of a filter refers to the energy that passes from a first port (e.g., an input port) of the filter to a second port (e.g., an output port) of the filter as a function of frequency. A filter response will typically include one or more pass-bands, which are frequency ranges where the filter passes signals with relatively small amounts of attenuation. A filter response also typically includes one or more stop-bands. A stop-band refers to a frequency range where the filter will substantially not pass signals, usually because the filter is designed to reflect backwards any signals that are incident on the filter in this frequency range. In some applications, it may be desirable that the filter response exhibit a high degree of "local selectivity," meaning that the transition from a pass-band to an adjacent stop-band occurs over a narrow frequency range. One technique for enhancing local selectivity is to add transmission zeros in the filter response. A "transmission zero" refers to a portion of a filter frequency response where the amount of signal energy that passes is very low. Transmission zeros are most typically achieved using cross-couplings.

Cross-coupling, which is the most common technique used to increase local selectivity in a resonant cavity filter, refers to intentional coupling between the resonating elements of non-adjacent cavities. Depending on the relative location of the transmission zero with respect to the pass-band, the sign of the required cross-coupling might vary. When cross-couplings are used to create transmission zeros, the cavities are often arranged in some form of a planar grid as opposed to the single row of cavities included in the filters 10 and 30 of FIGS. 1A-1B. Such a two-dimensional distribution of cavities facilitates coupling between non-adjacent cavities (i.e., cross-couplings). U.S. Pat. No. 5,812,036 ("the '036 patent"), the contents of which are incorporated herein by reference, discloses various resonant cavity filters that have such two-dimensional cavity arrangements that include cross-coupling.

FIG. 2 of the present application is a top sectional view of a two dimensional resonant cavity filter 40 that is disclosed in the '036 patent. As shown in FIG. 2, the filter 40 includes a total of six cavities 18-1 through 18-6 which each have a respective coaxial resonator 20-1 through 20-6 disposed therein. Coupling windows 16-1 through 16-5 are provided that enable "main" couplings between adjacent ones of the six coaxial resonators 20-1 through 20-6 along the main transmission path through the filter 40 (i.e., between cavities 18-1 and 18-2, between cavities 18-2 and 18-3, between cavities 18-3 and 18-4, between cavities 18-4 and 18-5, and between cavities 18-5 and 18-6). In addition, the filter 40 includes two bypass coupling windows 26-1, 26-2 that enable cross-coupling between two pairs of non-adjacent resonators (namely, between cavities 18-1 and 18-6 and between cavities 18-2 and 18-5). The main couplings between the five sequential pairs of resonators 20 and the two cross-couplings between the two pairs of non-adjacent resonators 20 contribute to the overall transfer function of the filter 40.

Cross couplings may also be achieved in an in-line (i.e., one dimensional) resonant cavity filter by including some form of distributed coupling elements to implement the cross couplings. FIG. 3 illustrates a filter 50 that is implemented using this approach. As shown in FIG. 3, the filter 50 is an in-line filter having four cavities 18-1 through 18-4 that have respective coaxial resonators 20-1 through 20-4 mounted therein. Coupling windows 16 are provided that enable "main" couplings between adjacent ones of the four coaxial resonators 20. A distributed coupling element 60 in the form of a direct ohmic connection between coaxial resonator 20-1 and coaxial resonator 20-4 is also provided. The direct ohmic connection 60 may physically and electrically connect resonator 20-1 to resonator 20-4 without physically or electrically connecting to any of the intervening resonators (namely resonators 20-2 or 20-3 in this example). The use of the distributed coupling element 60 may, however, have various disadvantages including increased filter size, complexity and cost, susceptibility to damage, increased losses and/or reduced out-of-band attenuation.

In-line resonant cavity filters having cross couplings may also be realized without use of a distributed coupling element by providing some form of controlled mixed coupling between adjacent resonators so that the spurious (cross) couplings between non-adjacent resonators can be controlled to some extent. Such an approach is disclosed in U.S. Pat. No. 10,236,550, issued Mar. 19, 2019 ("the '550 patent"), the entire contents of which are incorporated herein by reference. FIG. 4 is a schematic cross-sectional view of a filter 70 which is one of the filters disclosed in the '550 patent.

As shown in FIG. 4, the filter 70 includes a metallic housing 12 that has a single cavity 18 formed therein. A plurality of coaxial resonators 20 are arranged in a row within the cavity 18. The top 72 and bottom 74 surfaces of the housing 12 form respective ground planes. A plurality of tuning screws 76 are provided in the top and bottom surfaces 72, 74 of housing 12 that extend into the cavity 18. Filter 70 further includes four conductive connectors 84, each of which provides a physical (ohmic) connection between respective adjacent pairs of resonators 20. The proximity of the resonators 20 and the absence of shielding walls may result in non-negligible couplings between both adjacent and non-adjacent resonators 20. The couplings will include both capacitive couplings and inductive couplings. The amount of capacitive and inductive coupling is a function of, among other things, the distance between the resonators 20. The amount of capacitive coupling may also be controlled by adjusting the length and/or width of the upper part of each resonator 20 to generate more or less capacitive coupling between different resonators 20. Capacitive coupling between adjacent resonators 20 will result in negative coupling values. Inductive coupling can be controlled by changing the distance between the resonators 20 and/or by adjusting the length of the lower part of each resonator 20 that connects to the bottom surface 74 of the housing 12. The inductive coupling results in positive coupling between both adjacent and non-adjacent resonators 20. Because the filter 70 is designed to have non-negligible inductive coupling between non-adjacent resonators 20, cross-coupling may be achieved in the filter 70 without employing discrete bypass connectors that ohmically connect non-adjacent resonators 20. The sign of the main couplings may be positive or negative depending upon the relative amounts of capacitive versus inductive coupling, while the signs of the cross-couplings are always positive.

SUMMARY

Pursuant to embodiments of the present invention, metallized dielectric waveguide filters are provided that include an upper metallized dielectric waveguide having a plurality of upper resonant cavities, the upper metallized dielectric waveguide comprising an upper dielectric block having metallized outer walls and a lower metallized dielectric waveguide having a plurality of lower resonant cavities, the lower metallized dielectric waveguide comprising a lower dielectric block having metallized outer walls. A first of the upper resonant cavities is operatively connected to a first of the lower resonant cavities via at least one coupling window. A first slot having metallized walls is provided in a portion of the upper dielectric block that is part of the first of the upper resonant cavities.

In some embodiments, the first slot may extend to a distal end of the first of the upper resonant cavities. In some embodiments, the first slot may extend longitudinally along a longitudinal axis of the upper metallized dielectric waveguide.

In some embodiments, the upper metallized dielectric waveguide is mounted on the lower metallized dielectric waveguide to form a folded filter having a generally U-shaped main transmission path. In such embodiments, the metallized dielectric waveguide filter may include a first cross-coupling between a second of the upper resonant cavities and a second of the lower resonant cavities.

In some embodiments, the metallized dielectric waveguide filter may further include a cross-coupling window that comprises an un-metallized portion of a bottom surface of the second of the upper resonant cavities and an un-metallized portion of a top surface of the second of the lower resonant cavities that at least partially overlaps with the un-metallized portion of the bottom surface of the second of the upper resonant cavities. The metallized dielectric waveguide filter may also include a second cross-coupling between a third of the upper resonant cavities and a third of the lower resonant cavities, wherein the second cross-coupling passes through the cross-coupling window. The first cross-coupling may have a negative sign and the second cross-coupling may have a positive sign. The cross-coupling window may be located in a middle of a region where the bottom surface of the second of the upper resonant cavities abuts the top surface of the second of the lower resonant cavities.

In some embodiments, a portion of the upper dielectric block that is part of the second of the upper resonant cavities may include a hole having metallized walls.

The metallized dielectric waveguide filter may also include a first input/output port that is connected to a third of the upper resonant cavities and a second input/output port that is connected to a third of the lower resonant cavities. The first of the upper resonant cavities may be the resonant cavity of the upper metallized dielectric waveguide that is farthest from the third of the upper resonant cavities.

In some embodiments, the coupling window may comprise an un-metallized portion of a bottom surface of the first of the upper resonant cavities and an un-metallized portion of a top surface of the first of the lower resonant cavities that at least partially overlaps with the un-metallized portion of the bottom surface of the first of the upper resonant cavities.

In some embodiments, the upper metallized dielectric waveguide may further comprise metallized vias that extend through the upper dielectric block to define the upper resonant cavities, and the lower metallized dielectric waveguide further may comprise metallized vias that extend through the lower dielectric block to define the lower resonant cavities.

In some embodiments, a second slot having metallized walls may be formed in a portion of the lower dielectric block that is part of the first of the lower resonant cavities.

In some embodiments, the upper metallized dielectric waveguide and the lower metallized dielectric waveguide may be identical.

In some embodiments, the at least one coupling window may comprise a first coupling window that extends generally transversely across an interface between the first of the upper resonant cavities and the first of the lower resonant cavities, and second and third coupling windows that extend generally longitudinally at or near opposed side edges of the interface between the first of the upper resonant cavities and the first of the lower resonant cavities.

In some embodiments, the at least one coupling window may comprise a first coupling window that extends generally transversely across a bottom surface of the first of the upper resonant cavities at or near a distal end of the first of the upper resonant cavities.

In some embodiments, the metallized dielectric waveguide filter may exhibit a return loss of less than 15 dB across all of a 3.4-3.8 GHz band and exhibits out-of-band rejection of at least 50 dB in the 4.4-5.0 GHz band.

In some embodiments, the metallized dielectric waveguide filter may be configured so that radio frequency (RF) signals propagate through the metallized dielectric waveguide filter in the $TE_{1,0,1}$ mode.

In some embodiments, a ratio between a height of the upper metallized dielectric waveguide and a width of the upper metallized dielectric waveguide may be between 0.42 and 0.48.

Pursuant to further embodiments of the present invention, metallized dielectric waveguide filters are provided that include an upper metallized dielectric waveguide having a first upper resonant cavity, a last upper resonant cavity, and at least one intermediate upper resonant cavity that is positioned between the first upper resonant cavity and the last upper resonant cavity, the upper metallized dielectric waveguide comprising an upper dielectric block having metallized outer walls and a lower metallized dielectric waveguide having a first lower resonant cavity, a last lower resonant cavity, and at least one intermediate lower resonant cavity that is positioned between the first lower resonant cavity and the last lower resonant cavity, the lower metallized dielectric waveguide comprising a lower dielectric block having metallized outer walls. The last upper resonant cavity is operatively connected to the first lower resonant cavity via a first coupling window, a second coupling window and a third coupling window.

DETAILED DESCRIPTION

Figure 1A:
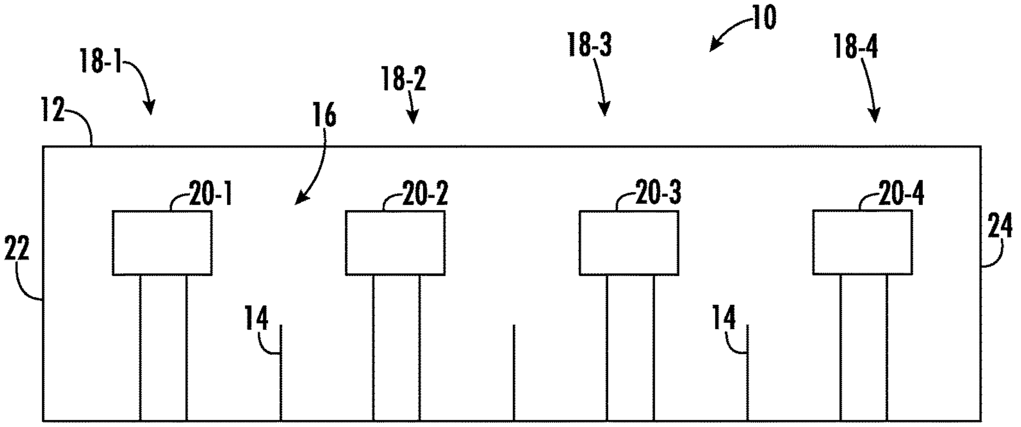
FIG. 1A PRIOR ART
FIG. 1A is a schematic side sectional view of a conventional in-line resonant cavity filter.
Figure 1B:
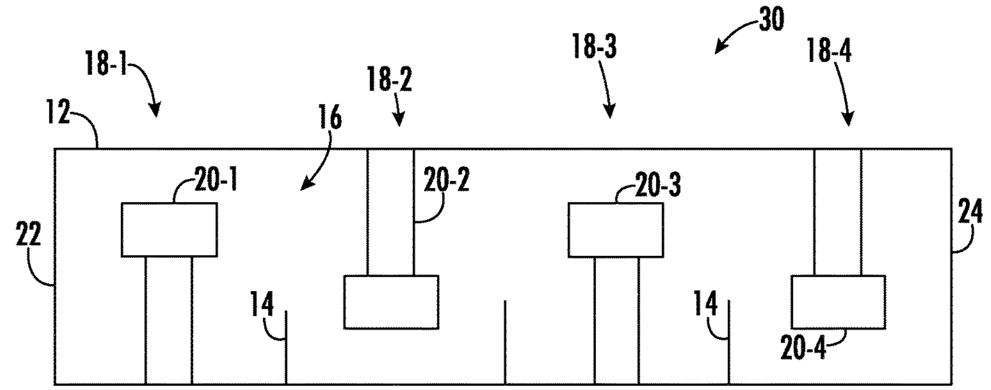
FIG. 1B PRIOR ART
FIG. 1B is a schematic side sectional view of another conventional in-line resonant cavity filter in which every other resonator is inverted.
Figure 2:
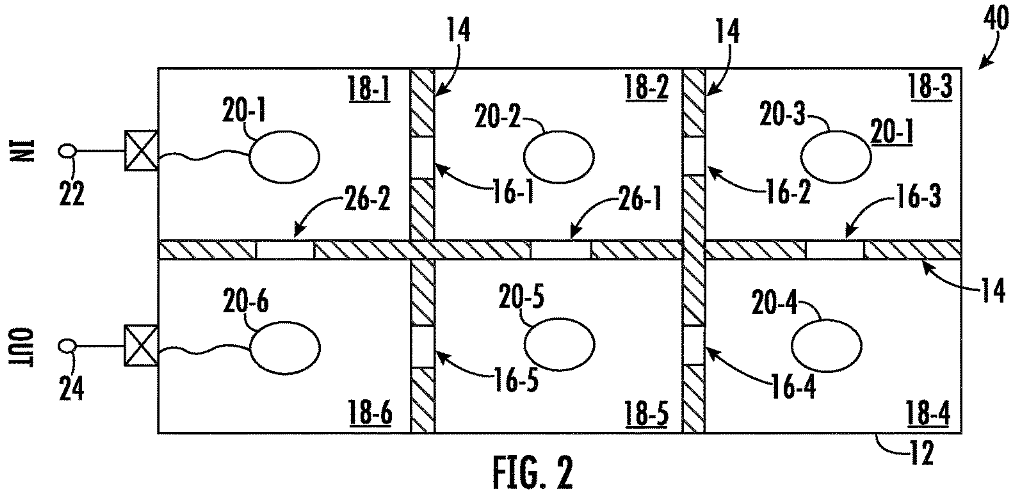
FIG. 2 PRIOR ART
FIG. 2 is a schematic top sectional view of a conventional resonant cavity filter that has cross-coupling between selected cavities.
Figure 3:
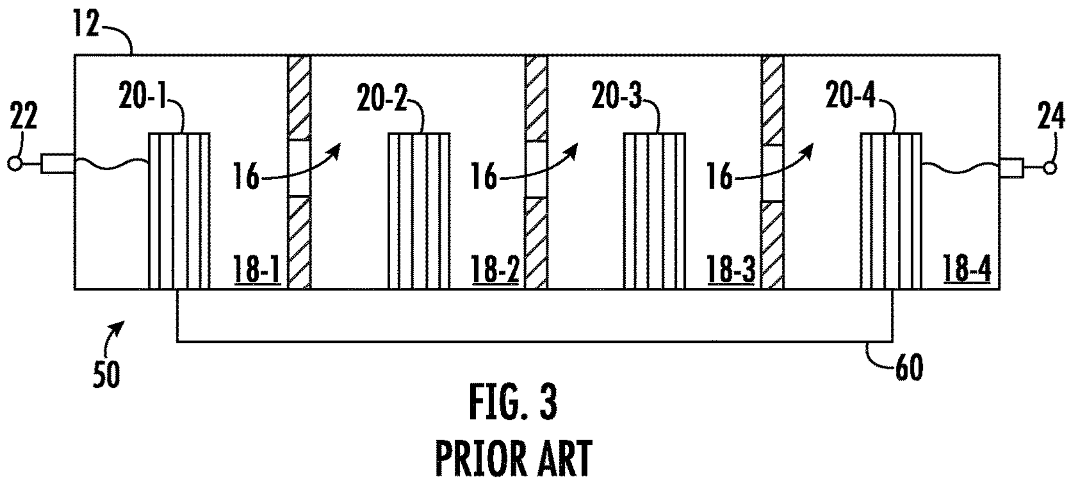
FIG. 3 PRIOR ART
FIG. 3 is a schematic side sectional view of a conventional in-line resonant cavity filter that has an external cross-coupling element.
Figure 4:
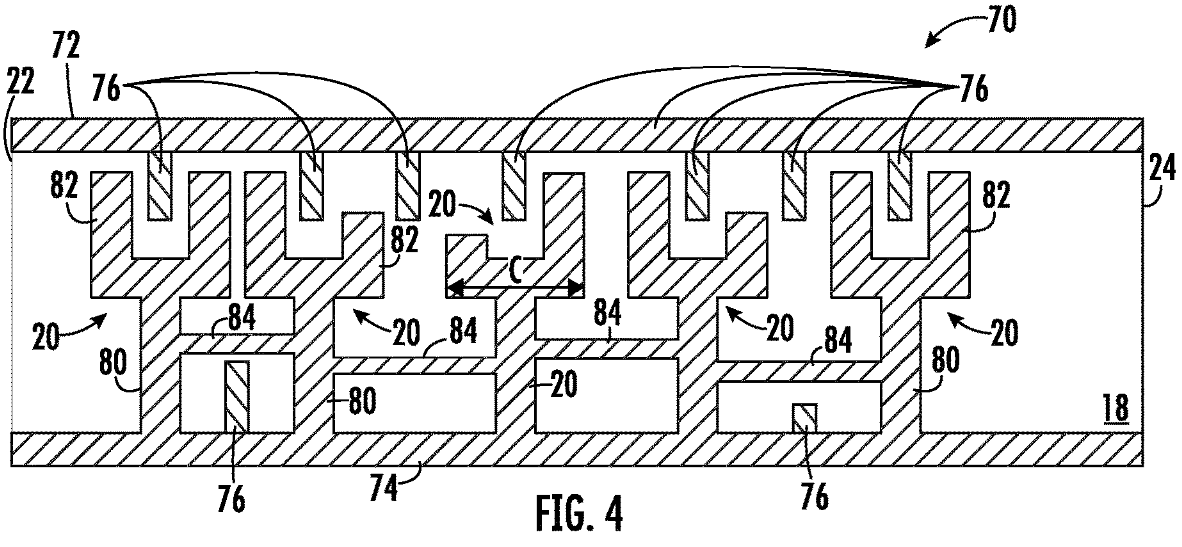
FIG. 4 PRIOR ART
FIG. 4 is a schematic side sectional view of a conventional in-line resonant cavity filter that has a filter response with transmission zeros.

A waveguide is a metal conduit that may be used to confine and direct RF signals. A waveguide filter is a filter that is formed using waveguide components. A main transmission path is defined between an input and an output of a waveguide filter. The waveguide filter may include a plurality of resonant cavities that form the main transmission path, where each resonant cavity is implemented as a short length of waveguide that is blocked at both ends thereof. Openings that are referred to as "coupling windows" are provided at the "blocked" ends of each waveguide section so that some portion of the electromagnetic wave is allowed to pass out of the resonant cavity and into an adjacent resonant cavity along the main transmission path (or out of the filter altogether). An electromagnetic wave that is trapped inside a resonant cavity is reflected back and forth between the two ends thereof, and will resonate at a characteristic frequency based on a given geometry of the resonant cavity. The resonance effect can be used to selectively pass certain frequencies through the coupling window into the adjacent resonant cavity. Additional openings that are called "cross-coupling windows" may be provided between resonant cavities that are not adjacent each other along the main transmission path. These cross-couplings may be used to generate transmission zeros in the frequency response of the filter, as explained above.

A metallized dielectric waveguide filter is a waveguide filter that is formed using one or more blocks of dielectric material that have metal provided on their exterior surfaces. Metallized dielectric waveguide filters can be viewed as a conventional waveguide filter where the air in the interior of the waveguide is replaced with a solid dielectric material. Metallized dielectric waveguide filters can be formed by metallizing the outside of one or more dielectric blocks. For example, metal may be plated on the block of dielectric material (and within holes and slots in the dielectric block) by a metallization process such as screen printing, spray coating, dip coating or thin film metallization process. Typically, each dielectric block comprises a block of material that has a high dielectric constant such as, for example, a ceramic block having a dielectric constant of 10 or more. Suitable ceramic materials include, for example, barium totanate and zirconium titanate materials. Generally speaking, the higher the dielectric constant of the dielectric material the greater the dimensions of the filter may be reduced. Vertically-extending metal-plated holes (which act as metallic posts) or other structures are formed within the dielectric block in order to form the individual resonant cavities within the metallized dielectric block. Metalized dielectric waveguide filters can exhibit a very high ratio of Q factor to volume, have low insertion losses, and can readily handle 10-20 Watts of power without generating unacceptable levels of passive intermodulation products. As such, metalized dielectric waveguide filters may be well-suited for many cellular applications. Metallized dielectric waveguide filters, however, can be relatively heavy, and hence they are generally only used at higher frequencies where the shorter wavelength of the RF signals reduces the overall size (and hence weight) of the filter.

One additional limitation associated with metallized dielectric waveguide filters is that they tend to have relatively small bandwidths compared to other filter technologies such as die-cast coaxial cavity filters. The bandwidth of a filter is typically defined as the ratio of the size of the pass band (i.e., the frequencies where the filter passes signal without significant loss) to the center frequency of the pass band. Metallized dielectric waveguide filters are available that operate in the 20 GHz frequency band. These filters, however, have pass bands that typically are only about 100-200 MHz (or less), and hence the bandwidth of these filters is only about 1-2%. Many cellular applications require filters having significantly larger pass bands, such as pass bands that exceed 10% of the center frequency of the pass band. As one example, the 3400-3800 MHz frequency band has recently been designated for various cellular applications. Filters designed to pass signals anywhere in this operating frequency band thus require a pass band of at least 400 MHz, which is over 11% of the 3.6 GHz center frequency of the operating frequency band. Typical requirements for the pass band are a return loss of less than 15 dB.

Another challenge with using metallized dielectric waveguide filters in cellular systems is that these filters tend to generate undesired or "spurious" modes at frequencies that are close to the pass band. Waveguide filters may be designed to transmit an electromagnetic wave in either a transverse electric (TE) mode or a transverse magnetic (TM) mode, as is well understood by those of ordinary skill in the art. In waveguide transmission systems, including waveguide filters, other undesired transmission modes may arise that may negatively affect the response of the filter. These undesired modes are referred to as "spurious modes." Spurious modes may result in the amount of rejection being reduced in a frequency range that is above the pass band frequency range. In many cases, cellular operators may require that the filters used in base station antennas have extremely high degrees of rejection at frequencies that are close to the pass band. If spurious modes fall within frequency ranges where such high degree of rejection is required, it may be difficult to meet the attenuation specifications.

The requirements of a large pass band and high rejection at frequencies close to the pass band may be particularly difficult to achieve with respect to metallized dielectric waveguide filters, because the techniques that are used to improve one of these parameters tend to degrade the other parameter. For example, to increase the bandwidth of the pass band, it is generally necessary to generate strong coupling between the resonant cavities, since the filter bandwidth generally increases with increased coupling strength. The typical way to increase the coupling is to increase the size of the coupling windows between the resonant cavities. Unfortunately, as the coupling windows are enlarged, spurious modes that resonate close to the pass band are generally moved (in frequency) closer to the pass band. When this occurs, it may be hard to achieve high levels of attenuation at frequencies near the pass band.

Pursuant to embodiments of the present invention, metallized dielectric waveguide filters are provided that have a wide bandwidth and which also provide good out-of-band rejection at frequencies close to the pass band. These filters may exhibit a very high Q factor, may be low loss, may have high power handling capability, and may be small and reasonably lightweight. These filters may also be cheaper and easier to manufacture than conventional die-cast coaxial cavity filters.

In some embodiments, metallized dielectric waveguide filters are provided that include an upper metallized dielectric waveguide having a plurality of upper resonant cavities and a lower metallized dielectric waveguide having a plurality of lower resonant cavities. The upper and lower metallized dielectric waveguides may comprise respective upper and lower dielectric blocks that each have metallized outer walls. The upper and lower metallized dielectric waveguides may include metallized vias that extend through the respective dielectric blocks to define the upper and lower resonant cavities. A first of the upper resonant cavities is operatively connected to a first of the lower resonant cavities via at least one coupling window. The coupling window may comprise an un-metallized portion of a bottom surface of the first of the upper resonant cavities and an overlapping un-metallized portion of a top surface of the first of the lower resonant cavities. A first slot having metallized walls is provided in a portion of the upper dielectric block that is part of the first of the upper resonant cavities. The first slot may extend to a distal end of the first of the upper resonant cavities, and may extend longitudinally along a longitudinal axis of the upper metallized dielectric waveguide. The first slot may be in the upper resonant cavity that is farthest from an input port of the filter.

The upper metallized dielectric waveguide may be mounted on the lower metallized dielectric waveguide to form a folded filter having a generally U-shaped main transmission path. The filter may include a cross-coupling window that comprises an un-metallized portion of a bottom surface of a second of the upper resonant cavities and an overlapping un-metallized portion of a top surface of a second of the lower resonant cavities. The cross-coupling window may be located in a middle of a region where the second of the upper resonant cavities abuts the second of the lower resonant cavities. A first cross-coupling between the second of the upper resonant cavities and the second of the lower resonant cavities is generated through this coupling widow. A second cross-coupling between a third of the upper resonant cavities and a third of the lower resonant cavities may also be generated through the cross-coupling window. The first cross-coupling may have a negative sign and the second cross-coupling may have a positive sign.

The upper and lower metallized dielectric waveguides may be identical in some embodiments, which may reduce manufacturing costs.

In other embodiments, metallized dielectric waveguide filters are provided that include upper and lower metallized dielectric waveguides. The upper dielectric waveguide has a first upper resonant cavity, a last upper resonant cavity, and at least one intermediate upper resonant cavity that is positioned therebetween, and the lower dielectric waveguide similarly has a first lower resonant cavity, a last lower resonant cavity, and at least one intermediate lower resonant cavity that is positioned therebetween. The upper and lower metallized dielectric waveguides each comprise a dielectric block having metallized outer walls. The last upper resonant cavity is operatively connected to the last lower resonant cavity via first, second and third coupling windows.

Each of the first through third coupling windows may comprise a respective un-metallized portion of a bottom surface of the last upper resonant cavity and a respective un-metallized portion of a top surface of the last lower resonant cavity that at least partially overlaps with the respective un-metallized portion of the bottom surface of the last upper resonant cavity. The first coupling window may extend generally transversely across an interface between the last upper resonant cavity and the last lower resonant cavity, and the second and third coupling windows may extend generally longitudinally at or near opposed side edges of the interface between the last upper resonant cavity and the last lower resonant cavity. The first coupling window may be positioned at or near distal ends of the interface between the last upper resonant cavity and the last lower resonant cavity. Moreover, the first coupling window may not overlap with either the second coupling window or the third coupling window along any axis that extends parallel to a longitudinal axis of the metallized dielectric waveguide filter.

Figure 5A:
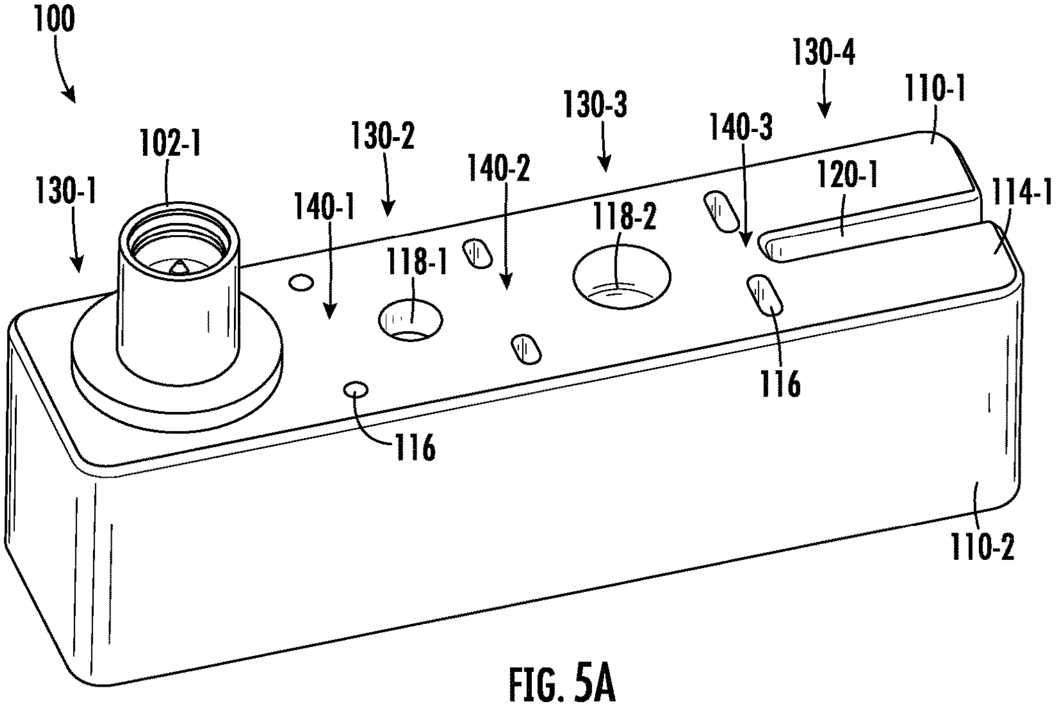
FIGS. 5A and 5B are a perspective view and an exploded perspective view, respectively, of a metallized dielectric waveguide filter according to embodiments of the present invention.
Figure 5B:
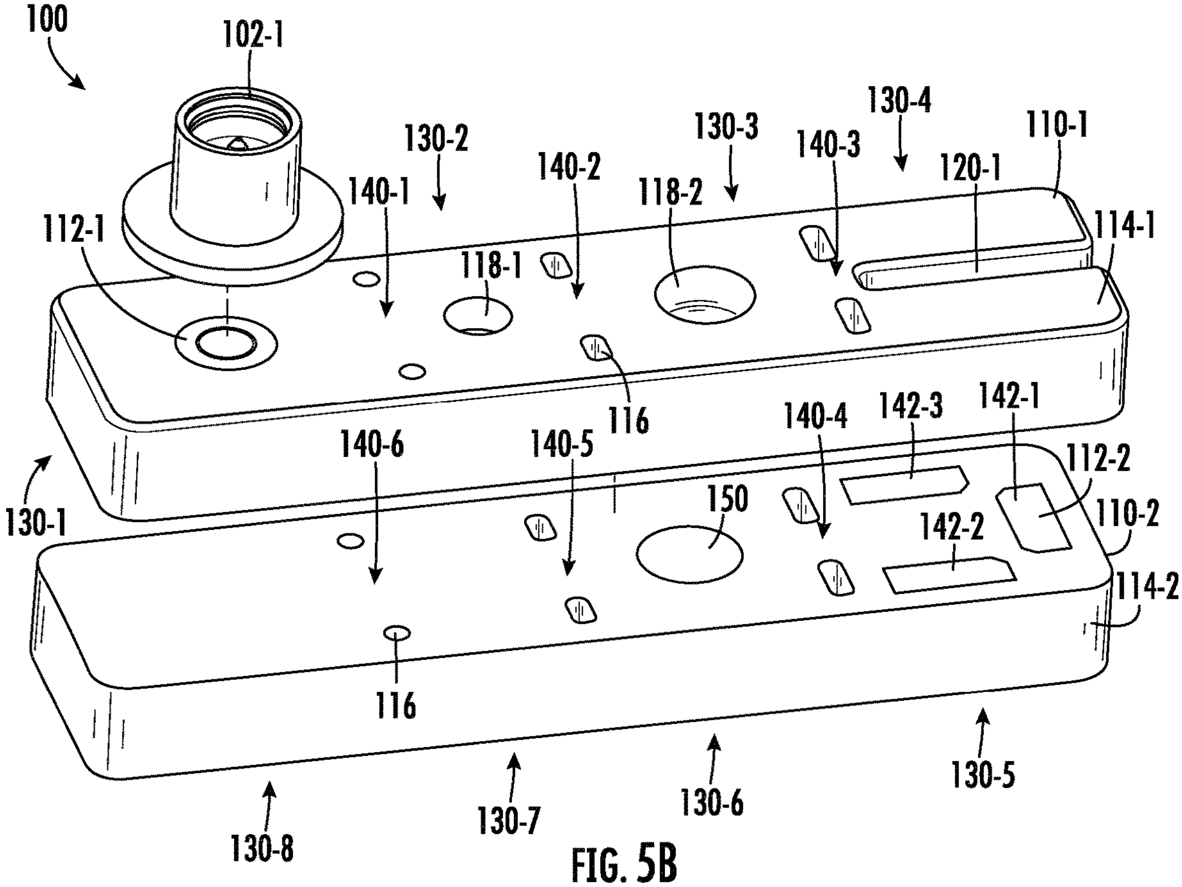
Figure 5C:
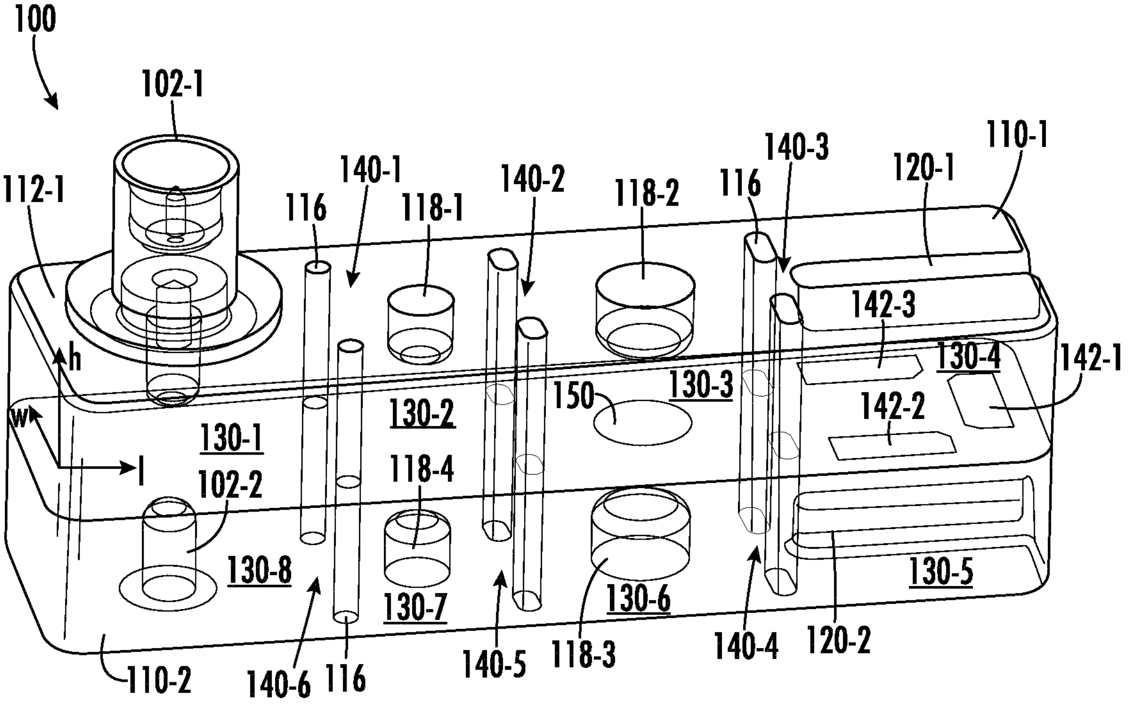
FIG. 5C is a shadow perspective view of the metallized dielectric waveguide filter of FIGS. 5A-5B.

FIGS. 5A-5C are various views of a metallized dielectric waveguide filter 100 according to certain embodiments of the present invention. The filter 100 may be, for example, designed to operate in the 3.4-3.8 GHz band, with a pass band return loss of less than 15 dB, a pass band insertion loss of less than 1.4 dB, out-of-band rejection of at least 35 dB in the 4.4-5.0 GHz frequency range, and significant rejection for frequencies up to 19 GHz. The filter 100 has a two layer "folded" topology having a first (upper) row of resonant cavities 130-1 through 130-4 and a second (lower) row of resonant cavities 130-5 through 130-8. In the depicted embodiment, the filter 100 includes a total of eight resonant cavities 130 and operates in the $TE_{1,0,1}$ mode. It will be appreciated, however, that in other embodiments the filter 100 may have different topologies (e.g., two folds to provide three rows of resonant cavities or as a single row filter), or may be designed to operate in a different transmission mode.

The metallized dielectric waveguide filter 100 includes an upper metallized dielectric waveguide 110-1 and a lower metallized dielectric waveguide 110-2. The upper dielectric waveguide 110-1 comprises an upper dielectric block 112-1 that has a (mostly) metallized outer surface 114-1. The lower dielectric waveguide 110-2 comprises a lower dielectric block 112-2 that has a (mostly) metallized outer surface 114-2. In some embodiments, the upper and lower metallized dielectric waveguides 110-1, 110-2 may have identical designs so that two instances of a single part may be used to implement the upper and lower metallized dielectric waveguides 110-1, 110-2. This arrangement may reduce manufacturing costs.

As noted above, resonant cavities 130-1 through 130-4 are formed in the upper dielectric waveguide 110-1 and resonant cavities 130-5 through 130-8 are formed in the lower metallized dielectric waveguide 110-2 Pairs of spaced-apart vertically-extending holes extend through the upper metallized dielectric block 112-1. These holes are metallized to provide metallized holes 116. Each pair of metallized holes 116 forms a respective coupling window 140. Coupling window 140-1 connects resonant cavity 130-1 to resonant cavity 130-2, coupling window 140-2 connects resonant cavity 130-2 to resonant cavity 130-3, and coupling window 140-3 connects resonant cavity 130-3 to resonant cavity 130-4. Similarly, pairs of spaced-apart vertically-extending holes extend through the lower dielectric block 112-2. These holes are metallized to provide metallized holes 116. Each pair of metallized holes 116 forms a respective coupling window 140. Coupling window 140-4 connects resonant cavity 130-5 to resonant cavity 130-6, coupling window 140-5 connects resonant cavity 130-6 to resonant cavity 130-7, and coupling window 140-6 connects resonant cavity 130-7 to resonant cavity 130-8.

An input port 102-1 is coupled to resonant cavity 130-1 and an output port 102-2 (not shown in FIGS. 5A and 5B, and only partially shown in FIG. 5C) is coupled to resonant cavity 130-8.

Three regions on the bottom surface of resonant cavity 130-4 are not metallized, and three regions on the top surface of resonant cavity 130-5 are similarly not metallized. These un-metallized regions may be vertically aligned (or at least vertically overlapping) to form three coupling windows 142-1 through 142-3 that connect resonant cavity 130-4 to resonant cavity 130-5. Additionally, a region on bottom surface of resonant cavity 130-3 and a corresponding region on the top surface of resonant cavity 130-6 are not metallized to provide a cross-coupling window 150 between resonant cavities 130-3 and 130-6. A main transmission path through the filter 100 extends from the input port 102-1, through the eight resonant cavities 130-1 through 130-8 in numerical order and then through output port 102-2.

As is further shown in FIGS. 5A-5C, metallized circular holes 118-1, 118-2 are formed in the top surfaces of upper resonant cavities 130-2, 130-3, respectively, and metallized circular holes 118-3, 118-4 are formed in the bottom surfaces of lower resonant cavities 130-7, 130-6, respectively. These holes are referred to herein as "blind holes" and may be used to shape the electromagnetic field to increase the coupling through a coupling window and/or to increase the center frequency of the first spurious mode, as will be discussed in detail herein. Finally, first and second longitudinally extending slots 120-1, 120-2 are formed in the top surface of upper resonant cavity 130-4 and the bottom surface of lower resonant cavity 130-5, respectively. The slots 120-1, 120-2 each extend longitudinally along a center axis of the respective resonant cavities 130-4, 130-5, and in the depicted embodiment extend all the way to the distal end of the respective resonant cavities 130-4, 130-5 (i.e., the ends of the resonant cavities 130-4, 130-5 that are farthest from the input and output ports 102-1, 102-2).

In the depicted embodiment, the upper and lower metallized dielectric waveguides 110-1, 110-2 are identical so that the filter 100 may be constructed by soldering two identical pieces together. This may reduce manufacturing costs. The metallization on the bottom surface of the upper metallized dielectric waveguide 110-1 and on the top surface of the lower metallized dielectric waveguide 110-2 allows for the two metallized dielectric waveguides 110-1, 110-2 to be soldered together. In other embodiments, however, the upper and lower metallized dielectric waveguides 110-1, 110-2 may have different structures to further fine tune the performance of the filter 100. In an example embodiment, the dielectric material may comprise a ceramic. A dielectric constant of the dielectric material may be, for example, between 15 and 40.

Figure 6:
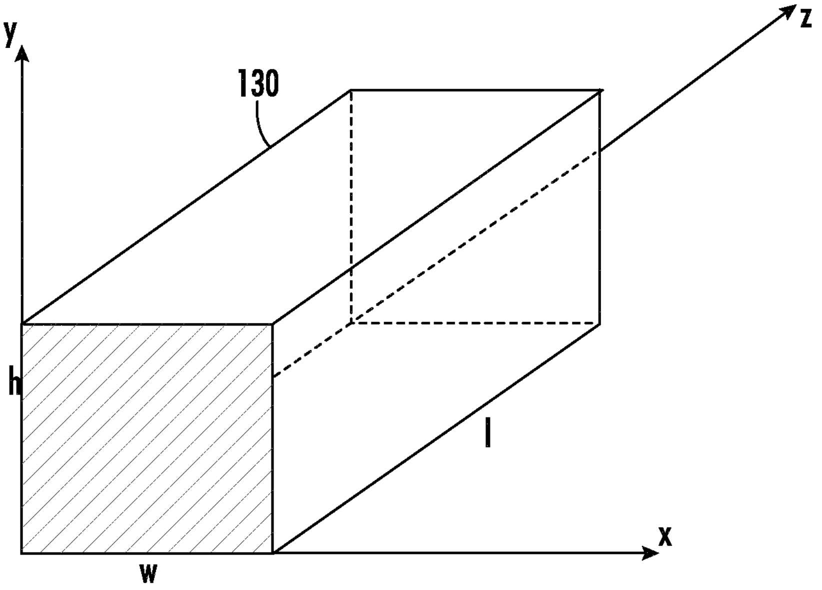
FIG. 6 is a schematic diagram illustrating the dimensions a rectangular resonant cavity of a metallized dielectric waveguide filter.

FIG. 6 is a schematic view of one of the resonant cavities 130 of metallized dielectric waveguide filter 100. As shown in FIG. 6, the resonant cavity 130 has a length l, a width w and a height h. The length dimension is the longitudinal direction of the dielectric block 112 in which the resonant cavity 130 is formed. The width and height dimensions are transverse to the length dimension and perpendicular to each other. All three dimensions are also shown in FIG. 5C with respect to resonant cavity 130-1.

Each resonant cavity 130 of filter 100 has a resonant frequency. For a resonant cavity 130 that has a rectangular shape, the resonant frequency may be determined based on the dimensions of the cavity and the dielectric constant (c) of the dielectric material as follows:

$$fres-cav=\frac{1}{2\pi\sqrt{\mu\varepsilon}}\cdot\sqrt{\left(\frac{\pi}{w}\right)^2+\left(\frac{\pi}{l}\right)^2} \tag{1}$$

where μ is the magnetic permeability of the dielectric material. Typically each resonant cavity 130 is designed to have approximately the same resonant frequency, which may be the center frequency of the pass band.

As is apparent from Equation (1), a desired resonant frequency for a resonant cavity 130 can be obtained by manipulating the length (l) and width (w) of the resonant cavity 130 and the dielectric constant of the dielectric block 112. However, the length l and width w (as well as the height h) heavily impact the electric and magnetic field distributions within the resonant cavity 130. Consequently, the length l, width w and height h must also be selected to take into account the couplings that are required between adjacent and non-adjacent resonant cavities 130 in order to obtain a desired filter response.

Figures 7A, 7B:
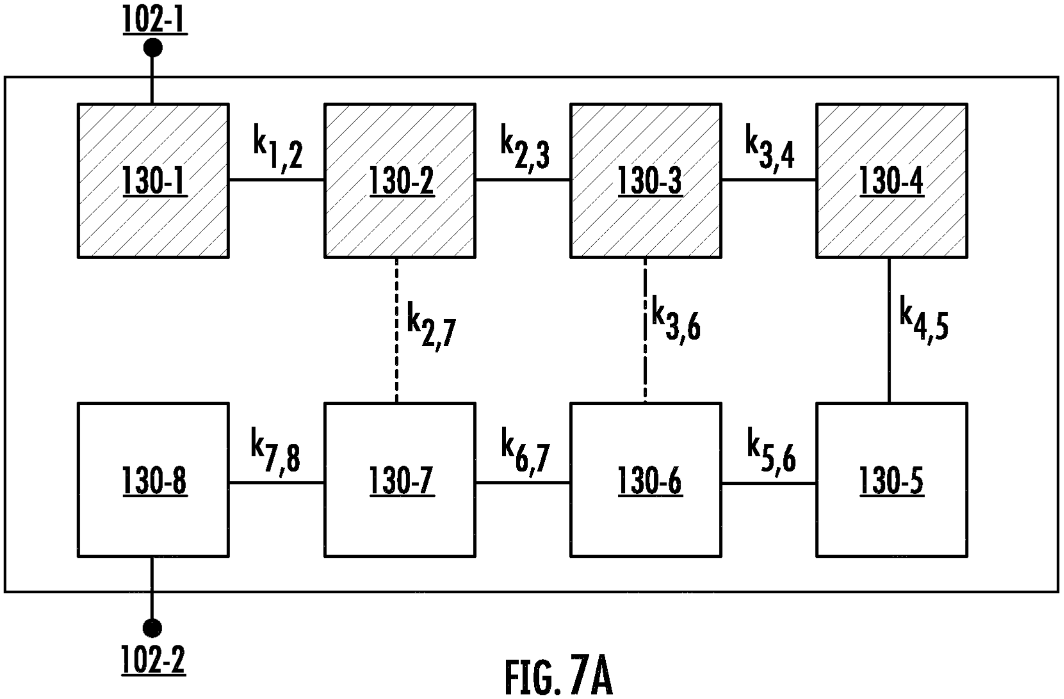
FIG. 7A is a schematic side view of the metallized dielectric waveguide filter of FIGS. 5A-5C that illustrates the different couplings between the resonant cavities thereof.
FIG. 7B is a table showing the sign and direction of the couplings included in the metallized dielectric waveguide filter of FIGS. 5A-5C.

The coupling between adjacent resonant cavities 130 include both horizontal couplings, which refer to couplings between two resonant cavities 130 that are part of the same metallized dielectric waveguide 110, as well as vertical couplings, which refer to couplings between two resonant cavities 130 that are adjacent along the main transmission path through the filter 100, but that are part of different metallized dielectric waveguides 110-1, 110-2. The horizontal and vertical couplings may be collectively referred to as the "in-line" couplings as they are couplings between resonant cavities 130 that are adjacent each other along the main transmission path. Additionally, one or more cross-couplings may be provided between two resonant cavities 130 that are not adjacent each other along main transmission path through the filter 100 and that are part of different metallized dielectric waveguides 110-1, 110-2. FIG. 7A shows the couplings $k_{i,j}$ that are present in filter 100. As shown in FIG. 7A, there are seven in-line couplings ($k_{1,2}$, $k_{2,3}$, $k_{3,4}$, $k_{4,5}$, $k_{5,6}$, $k_{6,7}$, $k_{7,8}$) and two cross-couplings ($k_{2,7}$, $k_{3,6}$). The value of the percent coupling $k_{i,j}$ between two resonant cavities is defined by Equation (2):

$$ki,j = \frac{f_{odd} - f_{even}}{\sqrt{f_{odd} \cdot f_{even}}} \cdot 100 \tag{2}$$

where $f_{odd}$ is the center frequency of the first transmission mode, and $f_{even}$ is the center frequency of the second transmission mode.

It has been found that in order to configure the filter 100 to have a large bandwidth, the values of many or even all of the in-line couplings may need to be greater than 5% (e.g., in the 5-10% range, or perhaps more). TABLE 1 below provides the values of each of the couplings for one embodiment of filter 100.

TABLE 1

| | | |
|---|---|---|
| $k_{1,2}$ = 9.524% | $k_{2,3}$ = 6.772% | $k_{3,4}$ = 5.8474% |
| $k_{4,5}$ = 8.243% | $k_{5,6}$ = 5.8474% | $k_{6,7}$ = 6.772% |
| $k_{7,8}$ = 9.524% | $k_{2,7}$ = 0.082% | $k_{3,6}$ = −2.321% |

The couplings can be characterized by their polarity (positive or negative). This is shown schematically in FIG. 7B. Filter 100 only includes three of the four types of couplings shown in FIG. 7B. Pursuant to embodiments of the present invention, techniques have been developed for generating strong couplings for each of the three types of couplings included in filter 100.

Figure 8A:
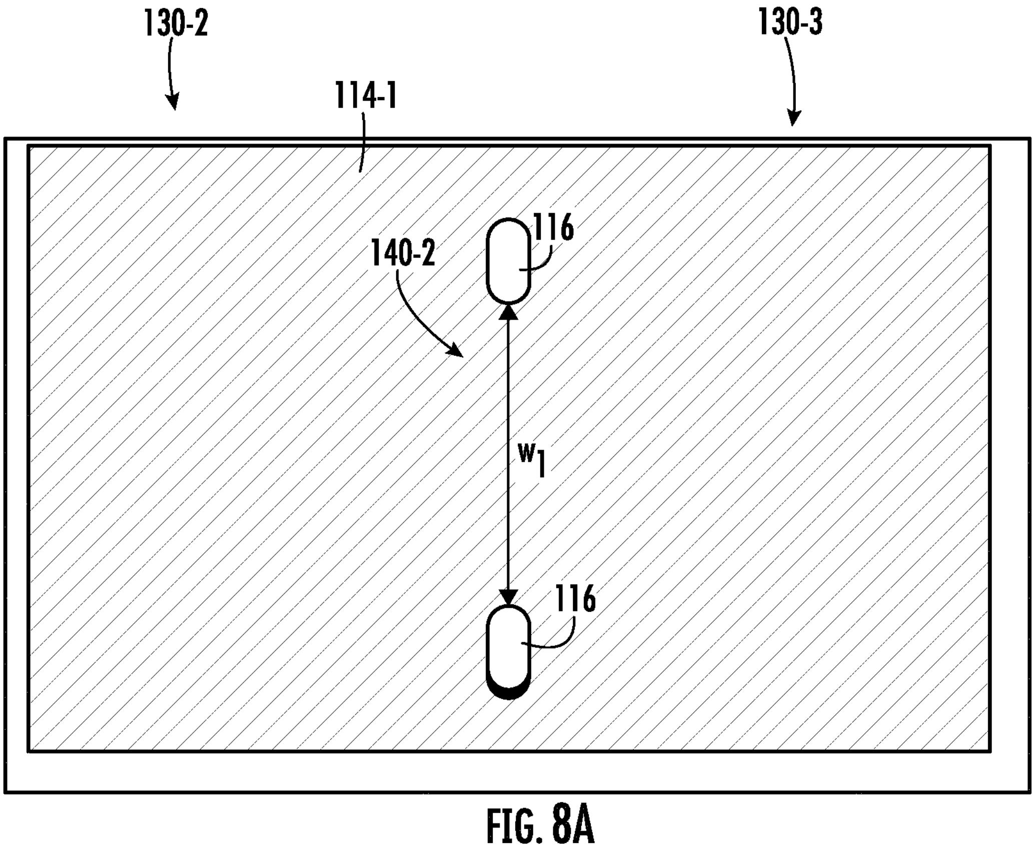
FIG. 8A is a top view of two adjacent resonant cavities of the metallized dielectric waveguide filter of FIGS. 5A-5C that illustrates a coupling window that defines the two resonant cavities.
Figure 8B:
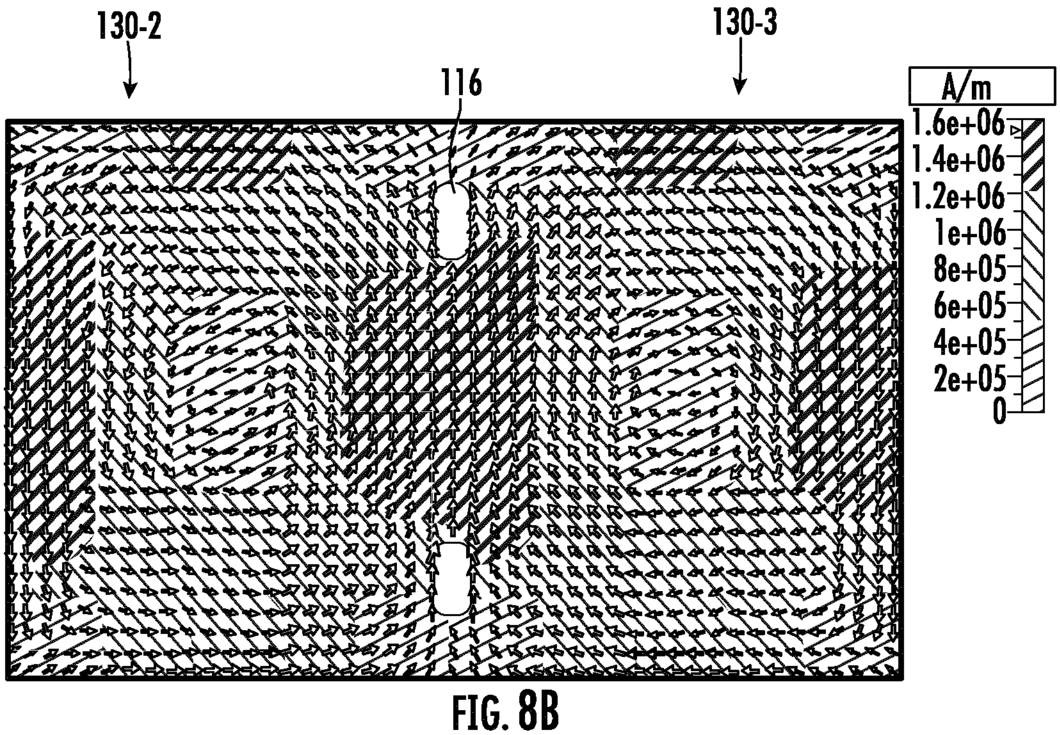
FIG. 8B is a cross-sectional view illustrating the magnetic fields generated in the two resonant cavities of FIG. 8A.

Positive horizontal couplings (e.g., couplings $k_{1,2}$, $k_{2,3}$, $k_{3,4}$, $k_{5,6}$, $k_{6,7}$, $k_{7,8}$) may be readily generated by having the magnetic field distributions in the resonant cavities 130 overlap in the vicinity of the coupling windows 140 that connect adjacent resonant cavities 130. This is shown, for example, in FIGS. 8A and 8B, where FIG. 8A is a top view of the two adjacent resonant cavities (here resonant cavities 130-2 and 130-3) and FIG. 8B is a cross-sectional view illustrating the magnetic fields generated in the two resonant cavities 130 of FIG. 8A. The magnitude of the coupling may be controlled by the size of the coupling window 140-2 (which in this embodiment is a window having a width w1). As discussed above, if the coupling needs to be greater than about 5%, then the size of the coupling window 140-2 (here w1) needs to be large. Unfortunately, as the size of the coupling window 140-2 is increased, the center frequency of the first spurious mode shifts toward the pass band. This may be problematic when, as here, it is necessary to have a high level of rejection at frequencies that are close to the pass band. Additionally, if the size of the coupling window 140-2 becomes too large, the transmission mode of the RF energy may switch from the $TE_{1,0,1}$ mode to the $TE_{1,0,2}$ mode, which is also problematic.

Figure 9A:
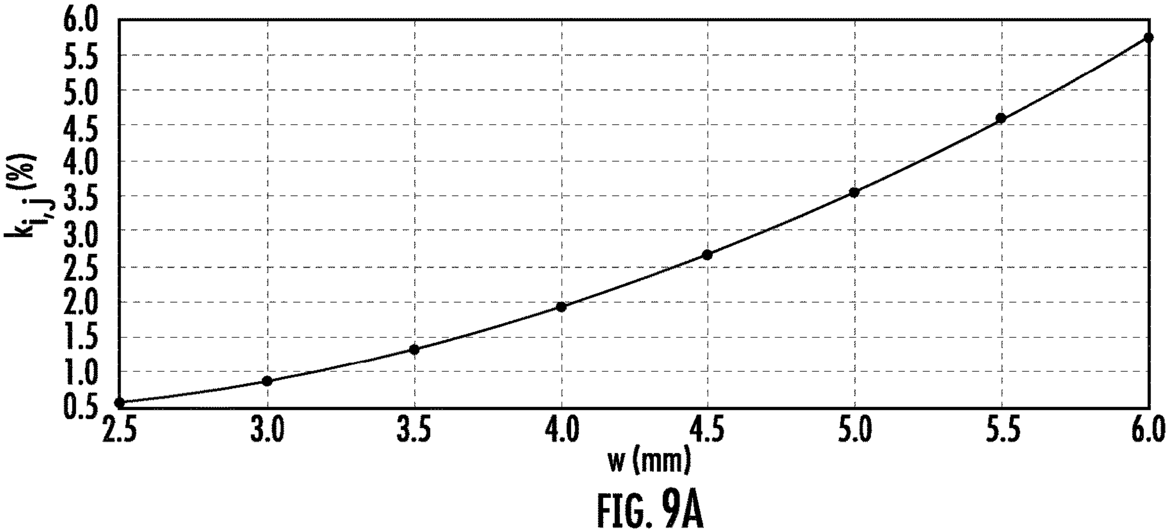
FIG. 9A is a graph that illustrates how the positive horizontal coupling increases as a function of the width of the coupling window that connects two adjacent resonant cavities.
Figure 9B:
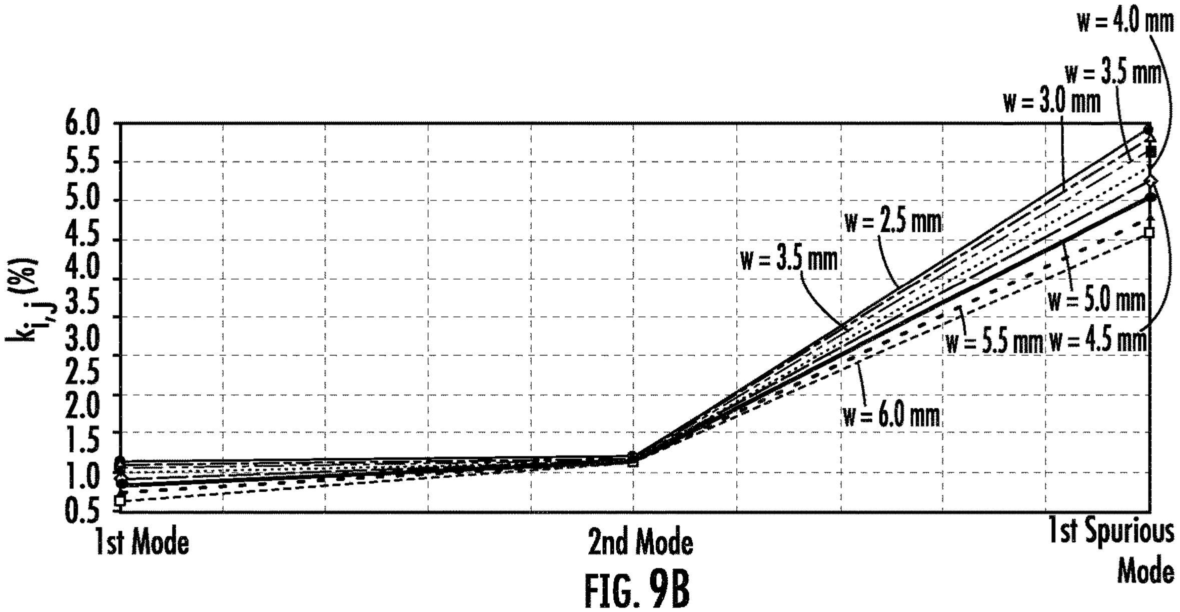
FIG. 9B is a graph that illustrates the variation in the center frequency of the first spurious transmission mode for the two resonant cavities shown in FIG. 9A as a function of the width of the coupling window.

FIG. 9A is a graph that illustrates how the positive, horizontal coupling increases as a function of the width w1 of the coupling window 140-2. The coupling percentage $k_{2,3}$ increases from about 0.5% to nearly 6% as the width w1 of the coupling window 140 is increased from 2.5 mm to 6.0 mm. FIG. 9B is a graph that illustrates the variation in the center frequency of the first spurious transmission mode for the two resonant cavities 130-2, 130-3 shown in FIG. 9A as a function of the width of the coupling window 140-2 therebetween (where each curve in FIG. 9B corresponds to a different width w1). As shown in FIG. 9B, the center frequency of the first spurious mode decreases with increasing coupling window width, and falls below 5 GHz at a width of about 5 mm. Together, FIGS. 9A and 9B show that as the width of the coupling window is increased from 2.5 mm to 6 mm, the coupling increases from 0.5% to 6%, while the center frequency of the first spurious mode decreases from 5.36 GHz to 4.83 GHz.

In order to keep the size (here the width w1) of the coupling window 140 small (to prevent the center frequency of the first spurious mode from moving too close to the pass band), the length l, width w and height h of the resonant cavities 130 may be adjusted in order to increase the level of magnetic coupling in the vicinity of the coupling window 140-2. Changing the height h of the resonant cavities 130 may not be particularly effective in increasing the strength of the magnetic coupling in the vicinity of the coupling window 140. However, changing the width w of each resonant cavity 130 does have a significant impact on the magnetic field distribution. As discussed above, the resonant frequency of each resonant cavity 130 is a function of both the width w and the length l of the resonant cavity 130. Thus, in order to maintain the proper resonant frequency, it may be necessary to adjust the length l of the resonant cavity 130 as well as the width w in order to increase the coupling in the vicinity of the coupling window 140 while also maintaining the proper resonant frequency. In other embodiments, different cavities may be formed from dielectric materials having different dielectric constants instead of or in addition to changing the length and width of the cavities. In practice this solution may be more difficult to implement and/or more expensive but may be advantageous in certain applications, particularly where the size of the filter must fit within tight constraints.

TABLE 2 below provides an example as to how the width w and the length l of a resonant cavity 130 may be changed while maintaining the resonant frequency of the resonant cavity 130 at a desired value (which in the present example is 3.6 GHz). As shown in TABLE 2, the example combinations of w and h provide widely different amounts of coupling. Since the goal in the present example is to have strong coupling while keeping the frequency of the first spurious mode above 5.0 GHz, setting the width of the resonant cavities 130 at 13 mm and the length of the resonant cavities 130 at 11.5 mm appears to be the best candidate of the four example combinations.

TABLE 2

| Width (mm) | Length (mm) | $k_{i,j}$ (%) | Frequency of 1$^{st}$ Spurious Mode (MHz) |
|---|---|---|---|
| 11 | 16 | 1.4 | 4870 |
| 12 | 13.15 | 4 | 5170 |
| 13 | 11.5 | 8 | 5090 |
| 14 | 10.4 | 13 | 4730 |

Figure 10:
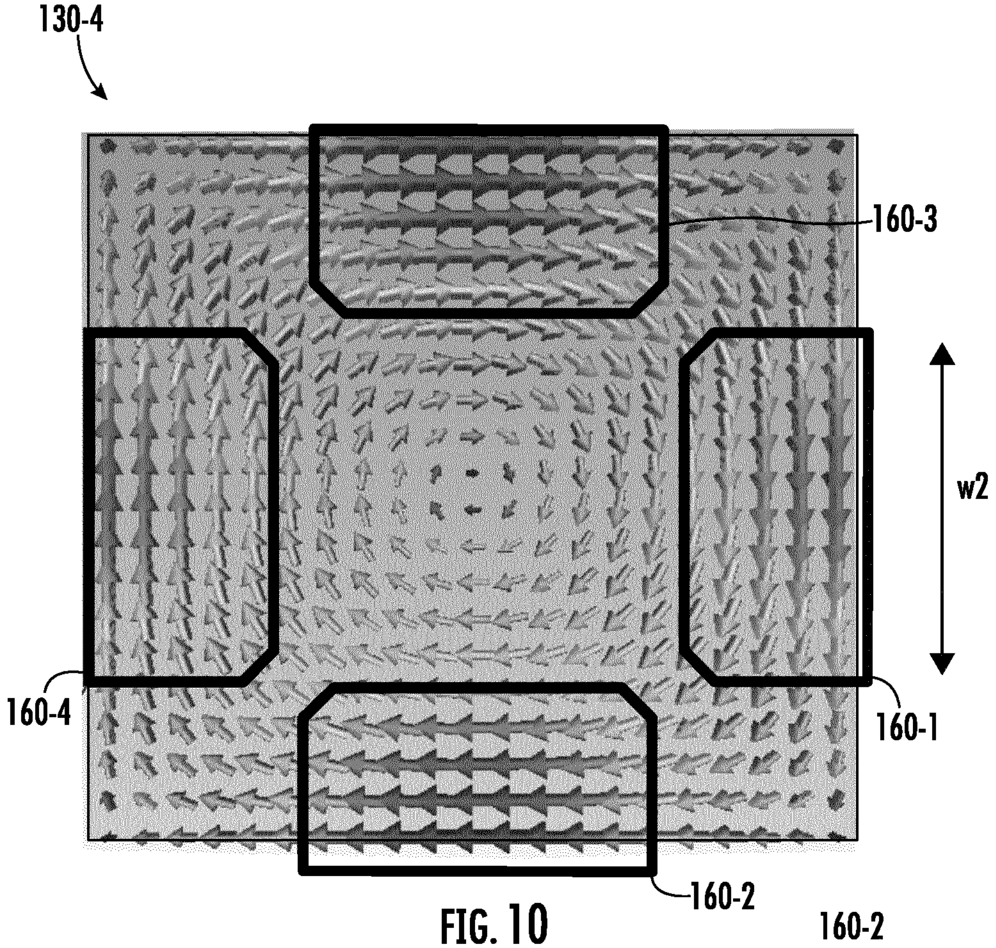
FIG. 10 is a horizontal cross-sectional view of the fourth resonant cavity of the metallized dielectric waveguide filter of FIGS. 5A-5C taken near the bottom of the resonant cavity that illustrates the intensity and direction of the magnetic field.

The second type of coupling in filter 100 is positive, vertical coupling. As this type of coupling is positive, it once again is generated by coupling between the magnetic fields in the two adjacent resonant cavities 130. FIG. 10 is a horizontal cross-sectional view of the fourth upper resonant cavity 130-4, where the horizontal cross-section is taken near the bottom of the resonant cavity 130-4. The arrows in FIG. 10 illustrate the strength and the direction of the magnetic field, with the heavier weight lines indicating stronger magnetic fields. As shown in FIG. 10, there are four regions where the magnetic field is the strongest, which are indicated by the boxes labelled 160-1 through 160-4 in FIG. 10.

In order to provide strong positive, vertical coupling between resonant cavities 130-4 and 130-5, the metallization in the bottom of resonant cavity 130-4 and the metallization in the top of resonant cavity 130-5 may be removed (or never formed) in the regions 160 where the magnetic fields are strong. This advantageously also minimizes electric field coupling between resonant cavities 130-4 and 130-5 (which is negative coupling that effectively offsets the magnetic coupling), as the electric field is most intense in the center of each resonant cavity 130-4, 130-5 where the magnetic field is weaker.

Figure 11A:
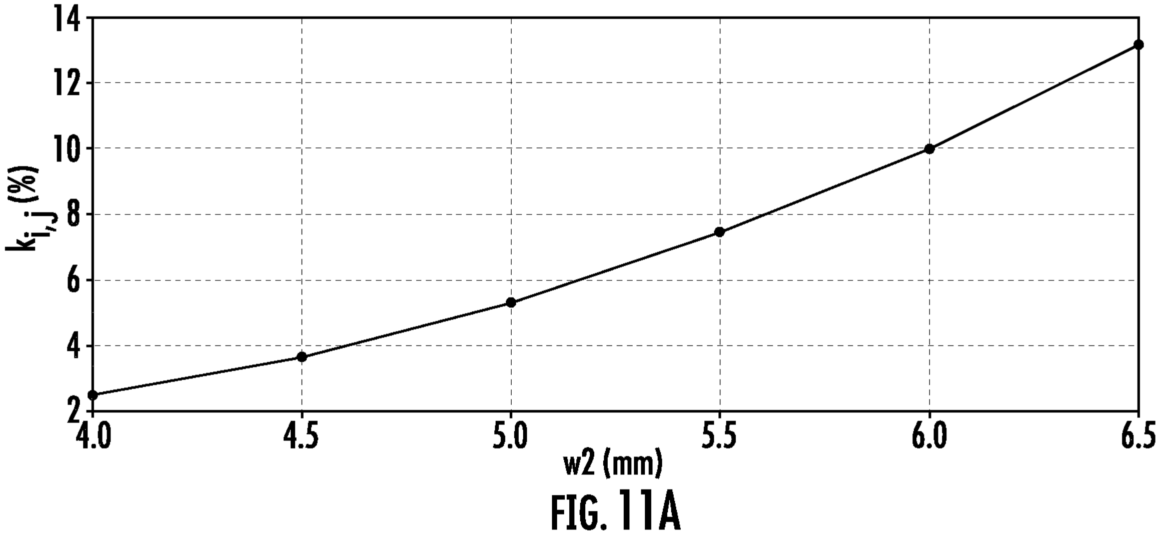
FIG. 11A is a graph that shows how the coupling between the fourth and fifth resonant cavities of the filter of FIGS. 5A-5C varies as a function of the width of the coupling windows therebetween.
Figure 11B:
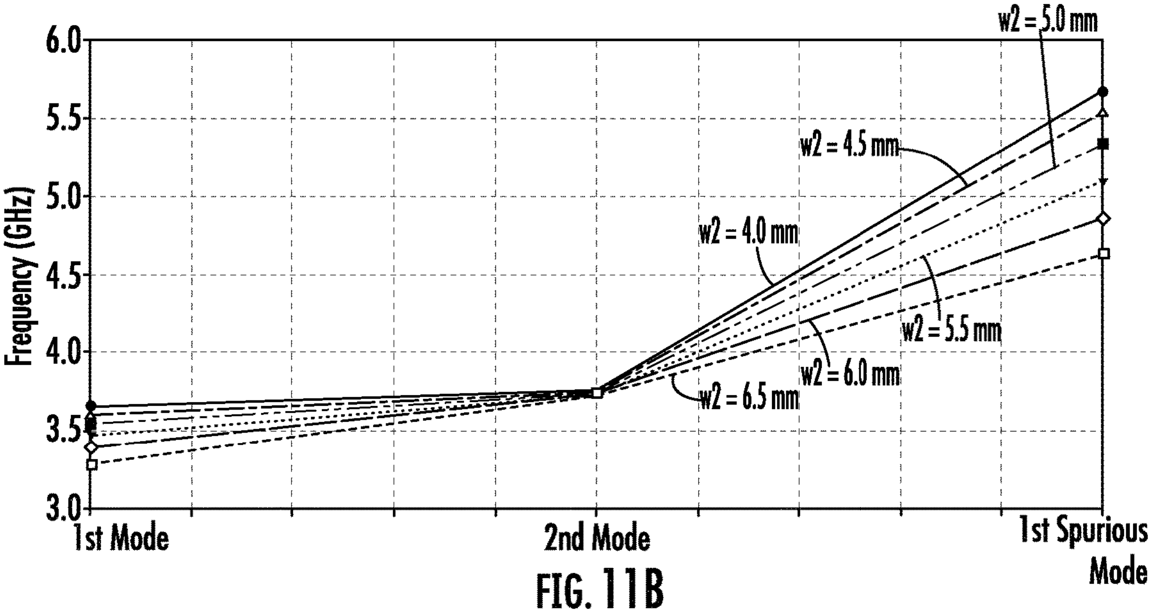
FIG. 11B is a graph that illustrates the variation in the center frequency of the first spurious transmission mode for the two cavities shown in FIG. 11A as a function of the width of the coupling windows.

In one example embodiment, three coupling windows 142-1, 142-2, 142-3 (i.e., non-metallized areas) were formed between resonant cavities 130-4 and 130-5 in the locations corresponding to regions 160-1 through 160-3 in FIG. 10. The longer dimension w2 of each coupling window 142-1, 142-2, 142-3 (i.e., either the width or the length depending upon the orientation of the coupling window 140) was varied from 4 mm to 6.5 mm. FIG. 11A is a graph that shows how the strength of the positive, vertical coupling between resonant cavities 130-4 and 130-5 varies with variation in the longer dimension w2 of the coupling windows 160-1 through 160-3. As shown in FIG. 11A, the positive, vertical coupling between resonant cavities 130-4 and 130-5 varies from about 2.5% at w2=4 mm to about 13% at w2=6.5 mm. FIG. 11B shows how the center frequency of the first spurious mode changes as a function of the longest dimension w2 of the coupling windows 142-1 through 142-3, varying from 5.68 GHz for w2=4 mm to 4.63 GHz for w2=6.5 mm. Thus, similar to the positive, horizontal couplings, where increasing the width of the coupling windows 140-1 through 140-6 provided both improved (i.e., stronger) coupling and deteriorated (i.e., lower in frequency) spurious mode rejection, here increasing the width of the coupling windows 142-1, 142-2, 142-3 only helps one of the two parameters (namely it provides stronger coupling) while degrading efforts to keep the frequency of the first spurious mode farther away from the pass band.

In an example embodiment, the first coupling window 142-1 extends generally transversely across an interface between upper resonant cavity 130-4 and lower resonant cavity 130-5. The second and third coupling windows 142-2, 142-3 each extend generally longitudinally at or near opposed side edges of the interface between upper resonant cavity 130-4 and lower resonant cavity 130-5. The first coupling window 142-1 is located at or near a distal end of the interface between resonant cavities 130-4 and 130-5.

Figure 12:
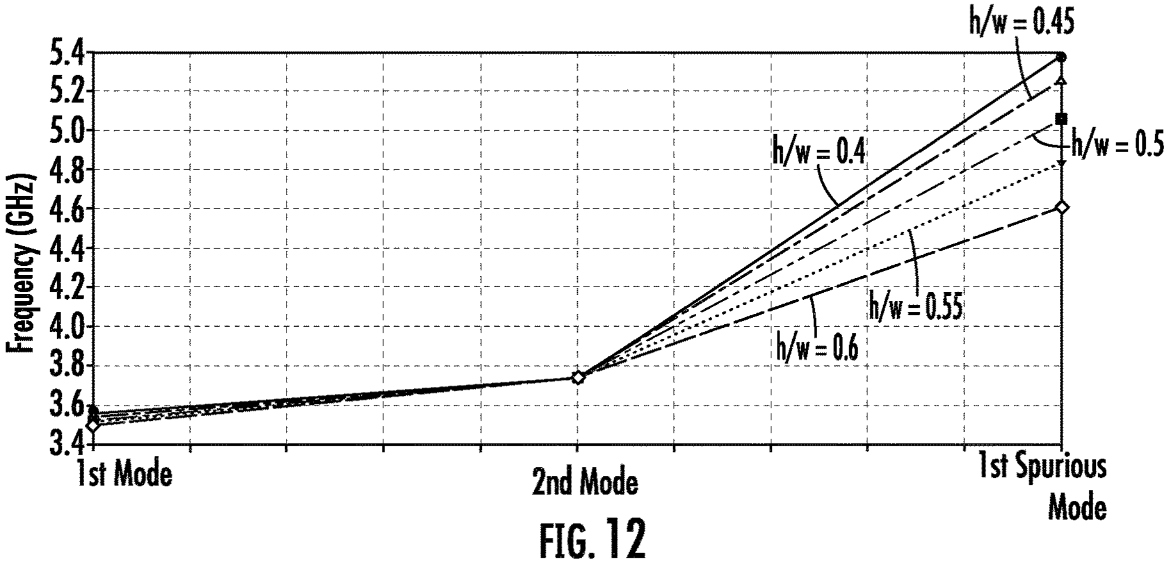
FIG. 12 is a graph illustrating the variation in the center frequency of the first spurious mode as a function of the height-to-width ratio for the resonant cavities of the filter of FIGS. 5A-5C.

Pursuant to embodiments of the present invention, several additional techniques may be employed in order to obtain sufficient levels of positive, vertical coupling between resonant cavities 130-4 and 130-5 while also keeping the center frequency of the first spurious mode above 5 GHz. In the first of these techniques, the height h of the resonant cavities 130 may be adjusted. Reducing the height h can advantageously push the center frequency of the first spurious mode higher. Unfortunately, however, the ratio of the resonant cavity height h to the resonant cavity width w is another key performance factor of the filter 100, as the Q factor of the filter 100 may be optimized when the ratio h/w=0.5. Since the width w may be set based on other considerations (as discussed above), reducing the height h may degrade the performance of filter 100. In some cases, however, some amount of deviation from the optimum height-to-width ratio may be tolerated (e.g., h/w=0.45) in order to move the center frequency of the first spurious mode away from the pass band. FIG. 12 illustrates how the frequency of the first spurious mode away changes as a function of the height-to-width ratio for the particular design of filter 100 discussed herein. In example embodiments, a ratio between a height of one or more of the resonant cavities 130 and the width of the resonant cavity may be between 0.42 and 0.48.

Figure 13A:
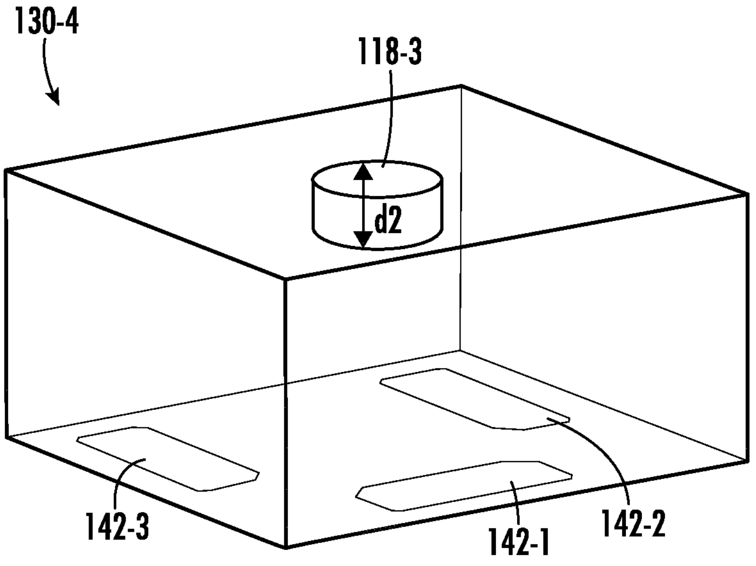
FIG. 13A is a shadow perspective view of a resonant cavity that includes a blind hole in the upper portion thereof.
Figure 13B:
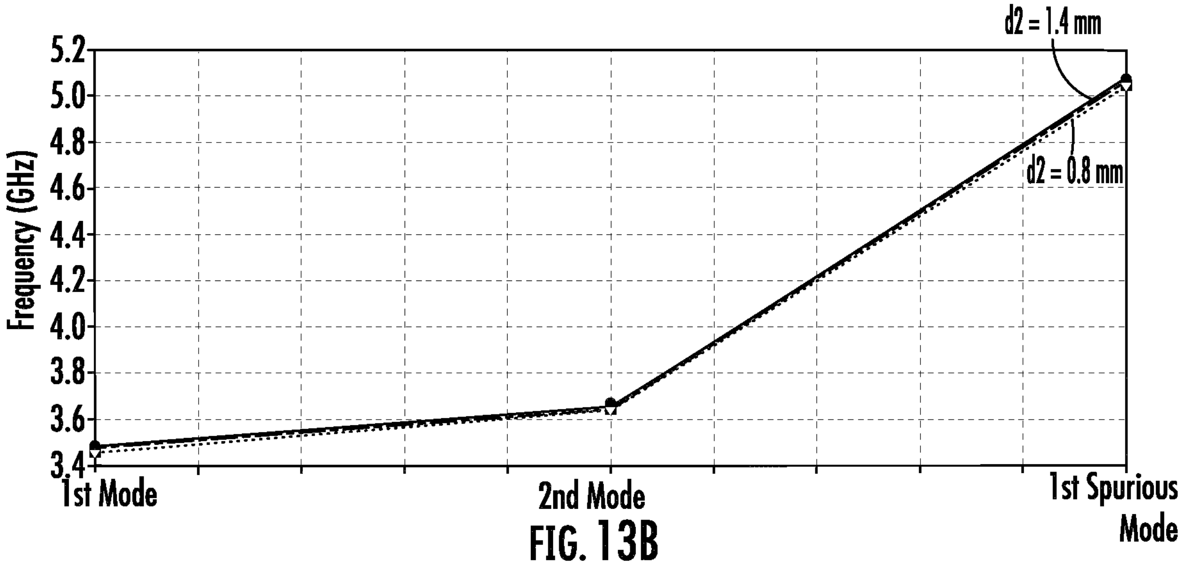
FIG. 13B is a graph illustrating the variation in the center frequency of the first spurious mode as a function of the depth of a blind hole in the resonant cavity of FIG. 13A.

The use of so-called blind holes is known in metallized dielectric waveguide filters. A blind hole refers to a hole that is formed in the top portion of the dielectric block in a resonant cavity 130, and the outside of the hole is metallized. FIG. 13A is a shadow perspective view of resonant cavity 130-4 when implemented with a blind hole 118 in the upper portion thereof. In the particular example here, adding blind hole 118 and implementing the blind hole 118 to have a depth d2 pushed the center frequency of the first spurious mode higher in frequency. As shown in the graph of FIG. 13B, this technique has limited ability to change the center frequency of the first spurious mode, and a change of only about 40 MHz was achieved even when using a relatively deep blind hole 118. The use of blind hole 118 also changes the resonant frequency of resonant cavity 130-4, but this may be compensated for by changing the length l of resonant cavity 130-4.

Figure 14A:
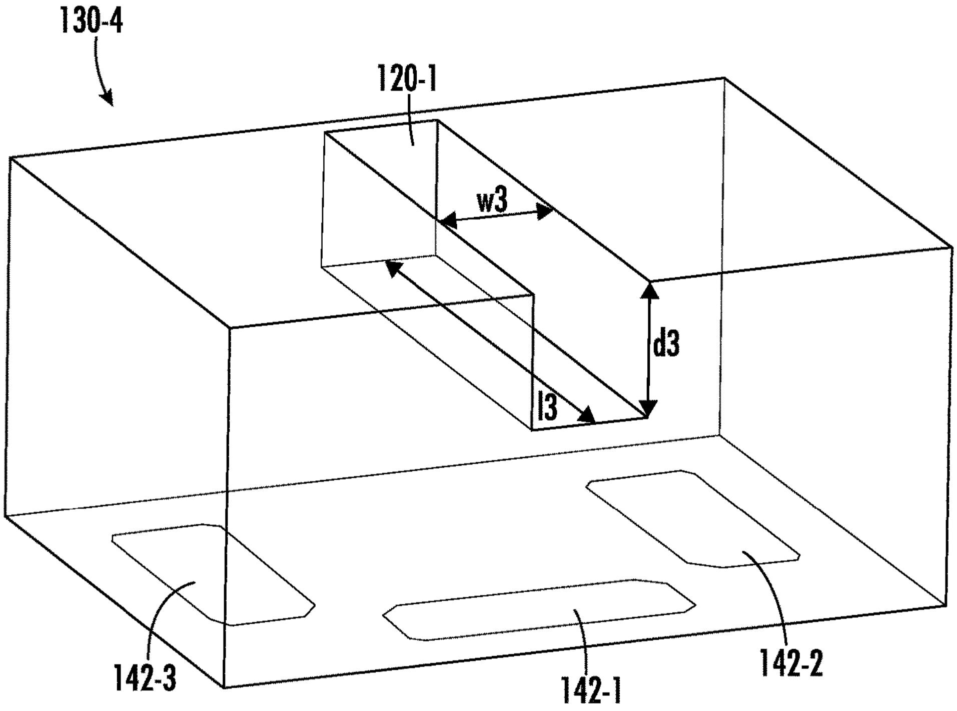
FIG. 14A is a shadow perspective view of a resonant cavity that includes a slot in the upper portion thereof.
Figure 14B:
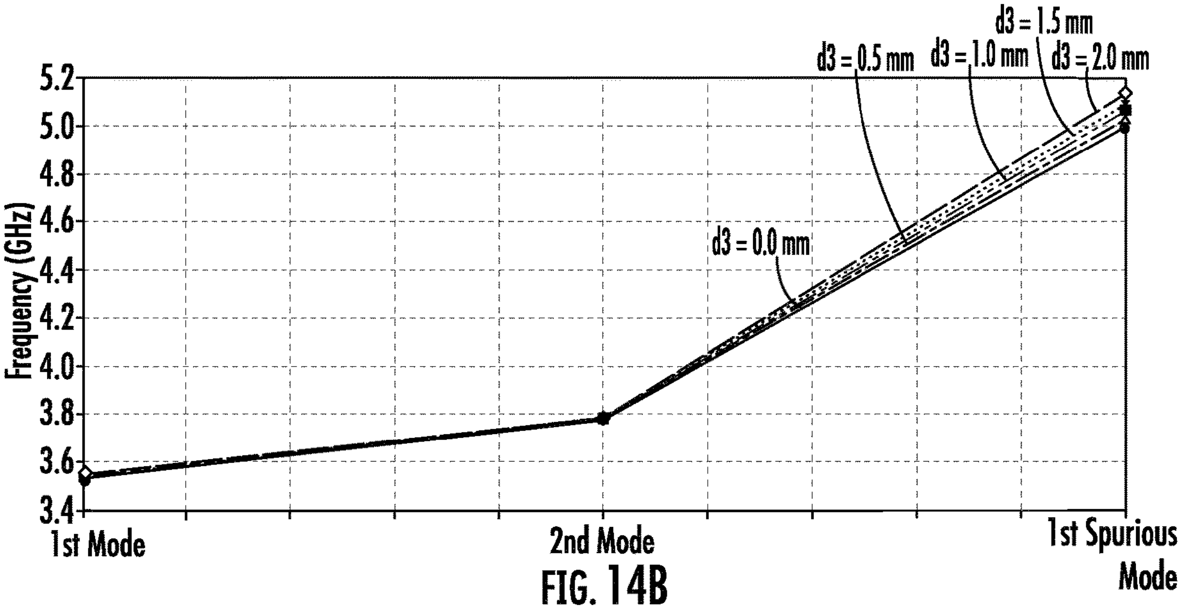
FIG. 14B is a graph illustrating the variation in the center frequency of the first spurious mode as a function of the depth of a slot in the resonant cavity of FIG. 14A.

It has been discovered that forming a longitudinally-extending slot 120-1 in the upper dielectric block 112-1 at the top of a resonant cavity 130 may have a greater impact on the center frequency of the first spurious mode than a blind hole 118, and may be used to move the center frequency of the first spurious mode more than 100 MHz higher. The slot 120-1 may be a longitudinally-extending slot 120-1 (i.e., the slot extends along the main transmission path of the upper metallized dielectric waveguide 110-1). FIG. 14A is a shadow perspective view of resonant cavity 130-4 when implemented with a slot 120-1 in the upper portion thereof. The center frequency of the spurious mode generally increases with increasing slot width w3 and depth d3. A length l3 of the slot 120-1 may be greater than a width w3 of the slot 120-1. Adding the slot 120-1 reduces the resonant frequency of resonant cavity 130-4, with the reduction in resonant frequency increasing with increasing slot depth d3. This reduction in resonant frequency may be compensated for, however, by decreasing the length l of resonant cavity 130-4. Increasing the width w3 of slot 120-1 may push the center frequency of the spurious mode even higher, but as the width w3 and/or the depth d3 of slot 120-1 become too large, the Q factor of the filter 100 may degrade unacceptably. FIG. 14B is a graph that illustrates the center frequency of the first spurious mode as a function of slot depth d3, assuming the slot 120-1 has a length l3 of 2 mm. In this particular example, adding slot 120-1 (with a depth of 2 mm) may increase the center frequency of the first spurious mode by about 130 MHz.

In the filter 100, slot 120-1 is provided in resonant cavity 130-4, and slot 120-2 is provided in resonant cavity 130-5. Embodiments of the present invention, however, are not limited thereto. In other embodiments, any of the remaining resonant cavities including one or more of resonant cavities 130-1 through 130-3 and 130-6 through 130-8 may include similar or identical slots 120. The slots 120 may extend the entire length of their respective resonant cavities 130 or less than the entire length thereof. The slots 120 may or may not extend to the distal end of their respective resonant cavities 130. The slots 120 may extend along the length direction 1 of the filter 100.

The provision of slots 120-1, 120-2 may significantly decrease the length of each of resonant cavities 130-4 and 130-5, since the provision of the slots 120 change the resonant frequency in a manner that necessitates reducing the length of each resonant cavity 130-4, 130-5 to obtain the desired resonant frequency. Thus, the provision of the slot may reduce the size of the filter 100, thereby reducing the cost and weight thereof.

Figure 15A:
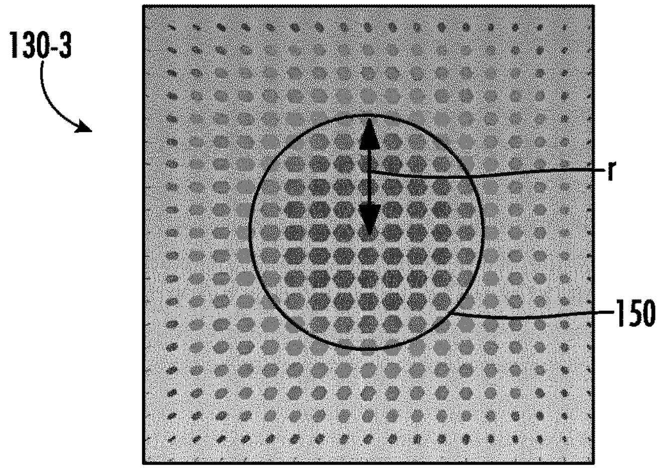
FIG. 15A is a horizontal cross-sectional view of the third resonant cavity of the metallized dielectric waveguide filter of FIGS. 5A-5C taken near the bottom of the resonant cavity that illustrates the intensity and direction of the magnetic fields as well as the size and location of a circular cross coupling window that is formed by omitting the metallization in the center of the bottom surface of the resonant cavity.

Metallized dielectric waveguide filter 100 also includes two cross-couplings between respective pairs of resonant cavities 130 that are not adjacent each other along the main transmission path. In particular, a negative cross-coupling is provided between resonant cavities 130-3 and 130-6 and a positive cross-coupling is provided between resonant cavities 130-2 and 130-7. The negative cross-coupling is generated by intermingling the electric fields for the two resonant cavities 130-3, 130-6 at issue. As discussed above, the electric field distribution is strongest in the center of the resonant cavities 130-3, 130-6. Thus, a negative cross-coupling may readily be generated by omitting the metallization at the center of the bottom of resonant cavity 130-3 and by omitting the metallization at the center of the top of the resonant cavity 130-6. These un-metallized regions may be vertically aligned, or may at least be vertically overlapping (i.e., a vertical axis extending through the filter 100 passes through both the un-metallized regions in the bottom of resonant cavity 130-3 and in the top of the resonant cavity 130-6). Here, circular openings in the metallization may be preferred in order to maximize the amount of coupling for an opening of a given size. FIG. 15A is a horizontal cross-sectional view of the resonant cavity 130-3 taken near the bottom thereof that illustrates the intensity and direction of the magnetic fields as well as the size and location of a circular cross coupling window 150 that is formed by omitting the metallization in the center of the bottom surface of the resonant cavity 130-3 and in the center of the top surface of resonant cavity 130-6.

Figure 15B:
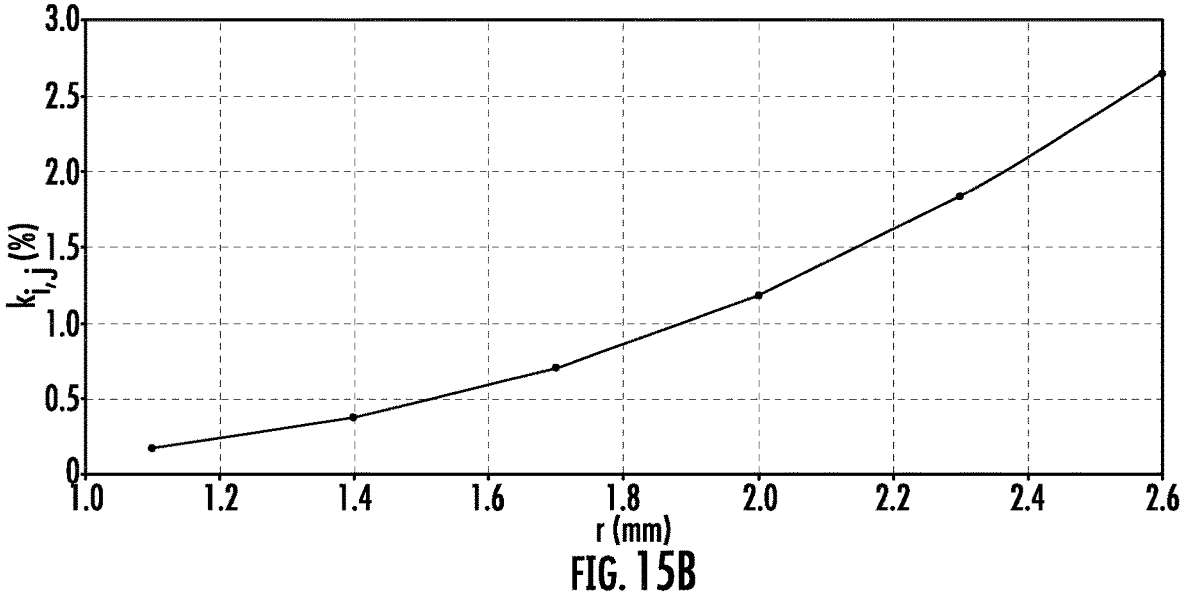
FIG. 15B is a graph that shows how the cross-coupling between the third and sixth resonant cavities of the filter of FIGS. 5A-5C varies as a function of the radius of the cross-coupling window of FIG. 15A.
Figure 15C:
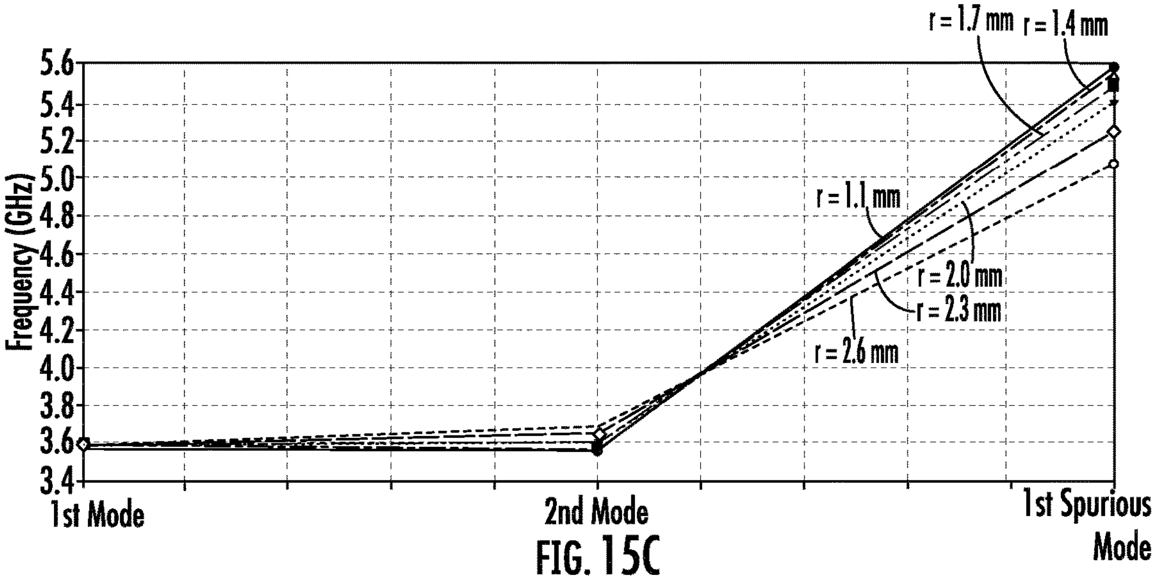
FIG. 15C is a graph that illustrates the variation in the center frequency of the first spurious transmission mode as a function of the radius of the cross-coupling window illustrated in FIG. 15A.

FIGS. 15B-15C show the impact of the size of the cross-coupling window 150 on both the magnitude of the negative cross-coupling and on the center frequency of the first spurious mode. As shown in FIG. 15B, increasing the radius r of the cross-coupling window 150 from 1.1 mm to 2.6 mm increases the negative cross-coupling from 0.2% to 2.7%. Unfortunately, however, this change results in a corresponding reduction in the center frequency of the first spurious mode from 5.6 GHz to 5.06 GHz, or a decrease of 540 MHz. Note that even with a large cross-coupling window 150, it is difficult to obtain high amounts of negative cross-coupling.

Figure 16A:
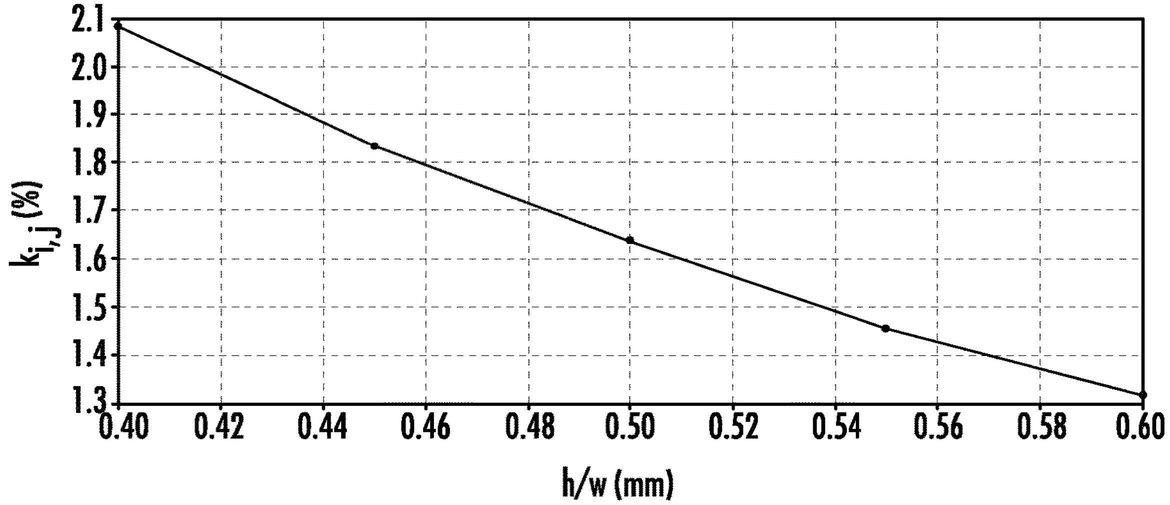
FIG. 16A is a graph that shows how the cross-coupling between the third and sixth resonant cavities of the filter of FIGS. 5A-5C varies as a function of the ratio of the height to the width of the resonant cavities.
Figure 16B:
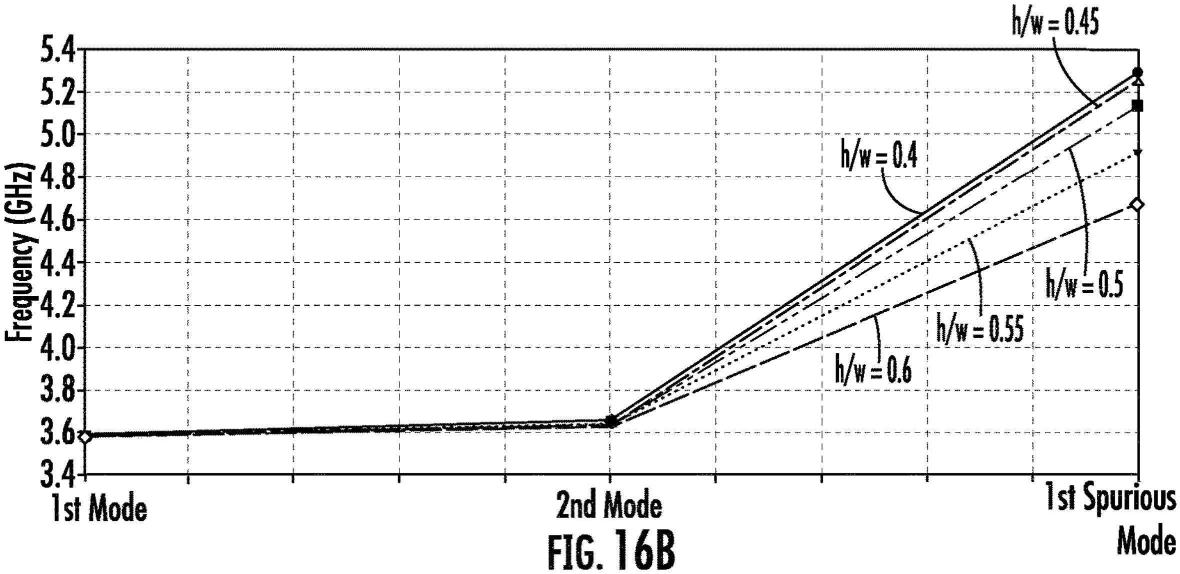
FIG. 16B is a graph that illustrates the variation in the center frequency of the first spurious transmission mode as a function of the ratio of the height to the width of the resonant cavities.

The negative cross-coupling may be increased by either reducing the height h of resonant cavities 130-3 and 130-6 or by increasing the width w of resonant cavities 130-3 and 130-6. Thus, reductions in the ratio h/w result in increased coupling. FIG. 16A illustrates how the ratio of h/w impacts the negative cross-coupling. FIG. 16B illustrates the center frequency of the first spurious mode for various of the h/w values shown in FIG. 16A. Notably, reducing the ratio h/w advantageously both increases the magnitude of the negative cross-coupling and also increases the center frequency of the first spurious mode. From a loss perspective, it is generally better to increase the width w instead of reducing the height h. However, as discussed above, increasing the width w has a negative impact on the generation of positive, vertical coupling. Thus, there is a tradeoff involved in increasing the width w of the resonant cavities.

Figure 17A:
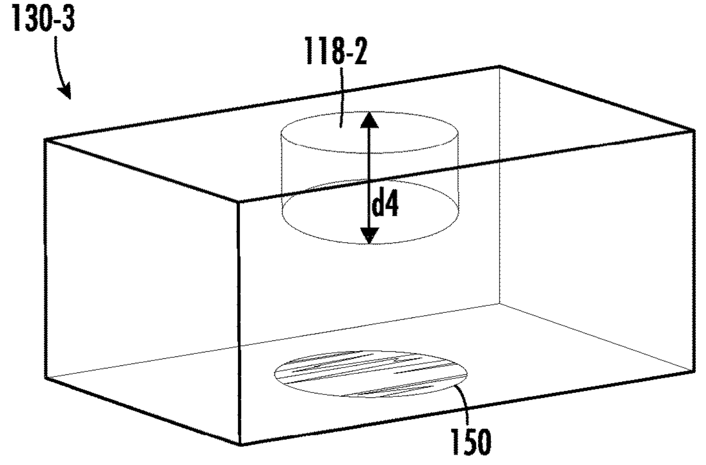
FIG. 17A is a shadow perspective view of a resonant cavity that includes both a blind hole and a cross-coupling window.
Figure 17B:
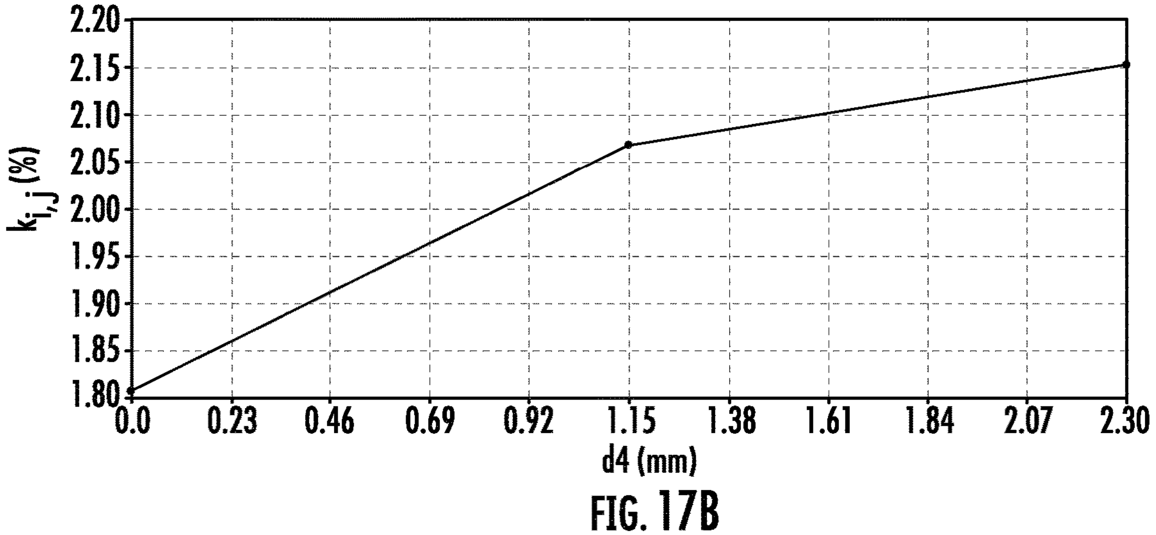
FIG. 17B is a graph that shows how the cross-coupling between the third and sixth resonant cavities of the filter of FIGS. 5A-5C varies as a function of the depths of blind holes formed in the third and sixth resonant cavities.
Figure 17C:
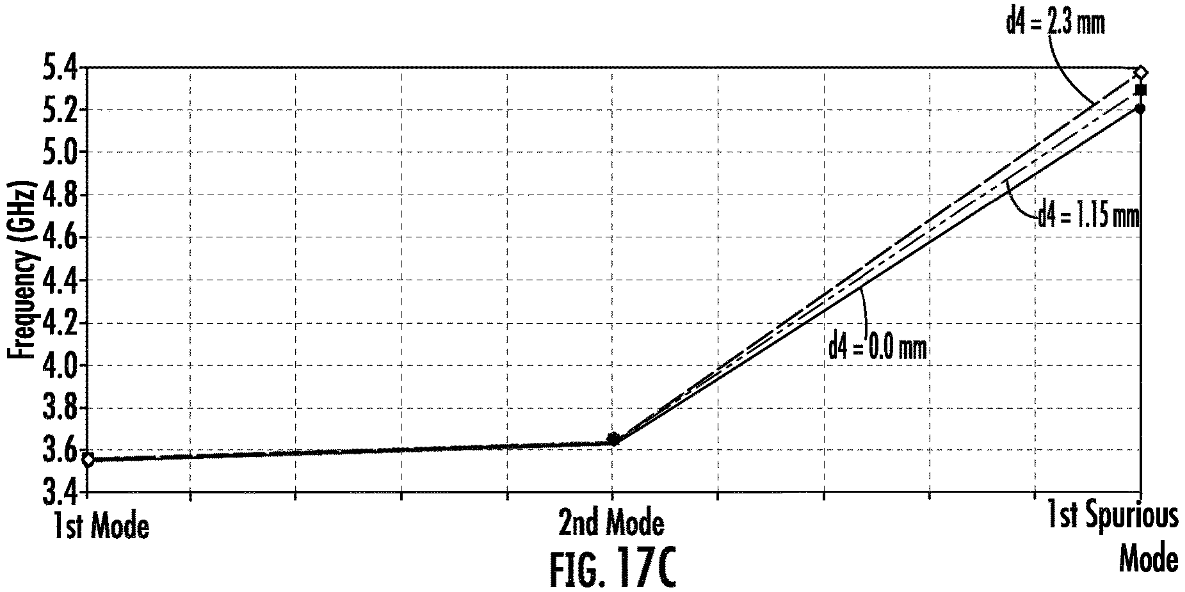
FIG. 17C is a graph that illustrates the variation in the center frequency of the first spurious transmission mode as a function of the blind hole depths shown in FIG. 17B.

Providing a blind hole 118-2 in the top of resonant cavity 130-3 and/or in the bottom of the resonant cavity 130-6 may help increase the magnitude of the negative cross-coupling and/or may push the center frequency of the first spurious mode further from the pass band. FIGS. 17A and 17B show these respective effects for the filter 100 where the height h of each of resonant cavities 130-3, 130-6 are equal to 0.45 times the width w of the respective resonant cavities 130-3, 130-6 (which are identical cavities in this embodiment). As shown in FIGS. 17A and 17B, as the depth of the blind holes 118-2 are increased, the negative cross-coupling increases, and the center frequency of the first spurious mode similarly increases. The length l of the resonant cavities 130-3, 130-6 must be decreased to compensate for the loading effect of the blind holes 118-2. Moreover, the Q factor of the filter 100 is also reduced by the provision of the blind hole 118-2, and the decrease in Q factor increases with increasing depths for the blind holes 118-2. Thus, blind holes 118-2 may be provided to generate sufficient negative cross-coupling, but the depths of the blind holes 118-2 may need to be limited to maintain a minimum required Q factor for the filter 100.

Two metallized dielectric waveguide filters were designed to investigate the tradeoff between insertion loss and moving the frequency of the first spurious mode farther from the pass band. The first design is a rectangular waveguide and the design focuses on minimizing the insertion loss. The second design is a single-ridged waveguide and focuses on providing higher out-of-band rejection.

Figure 18:
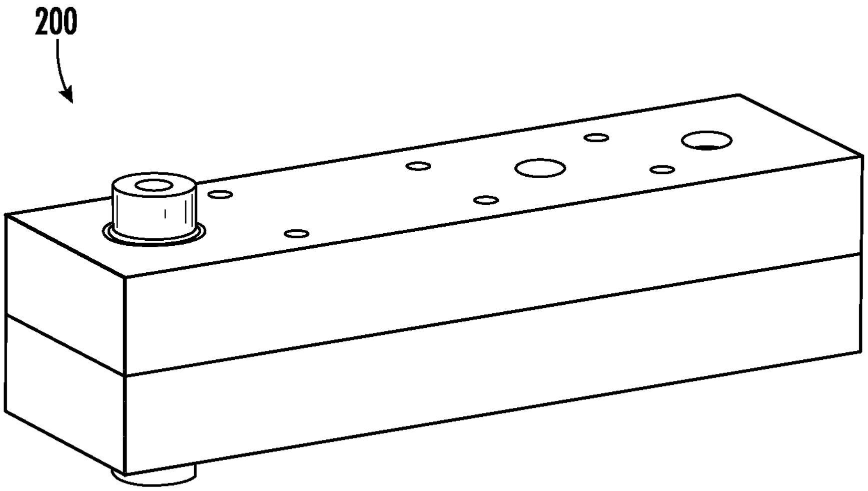
FIG. 18 is a perspective view of a filter according to certain embodiments of the present invention.
Figure 19A:
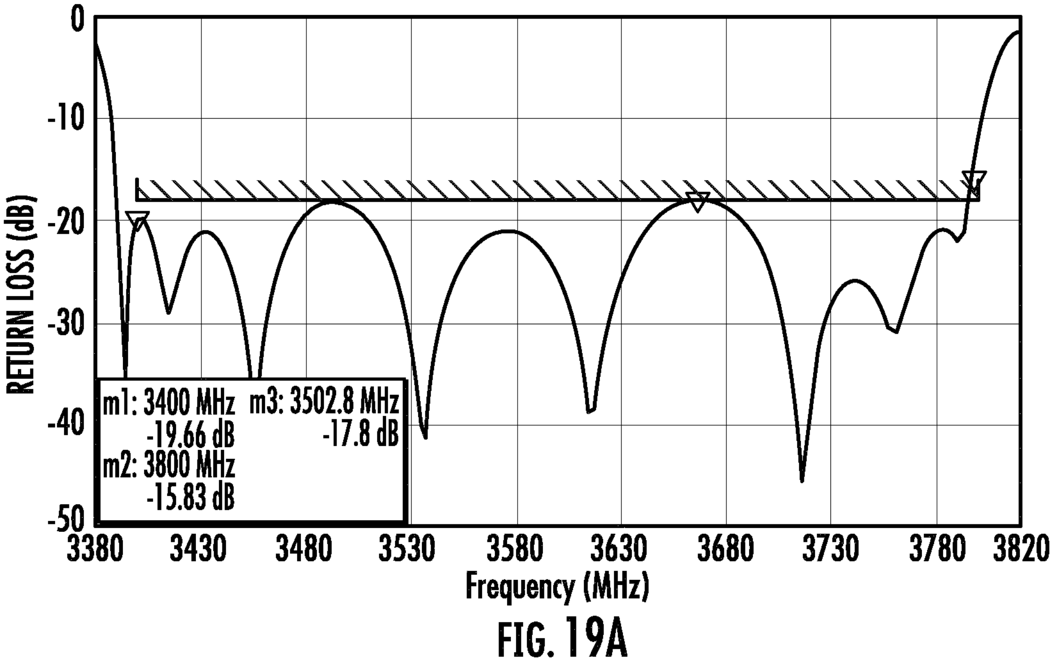
FIG. 19A is a graph of the simulated return loss for the filter of FIG. 18.
Figure 19B:
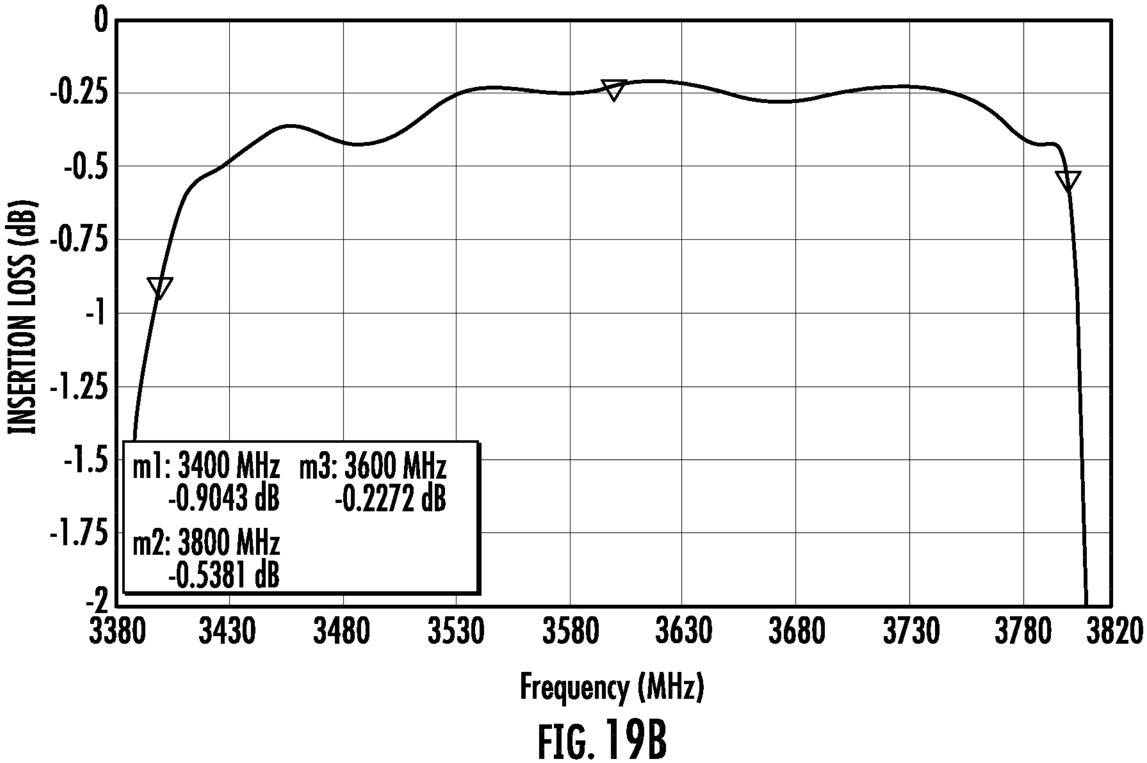
FIG. 19B is a graph of the simulated insertion loss for the filter of FIG. 18.
Figure 19C:
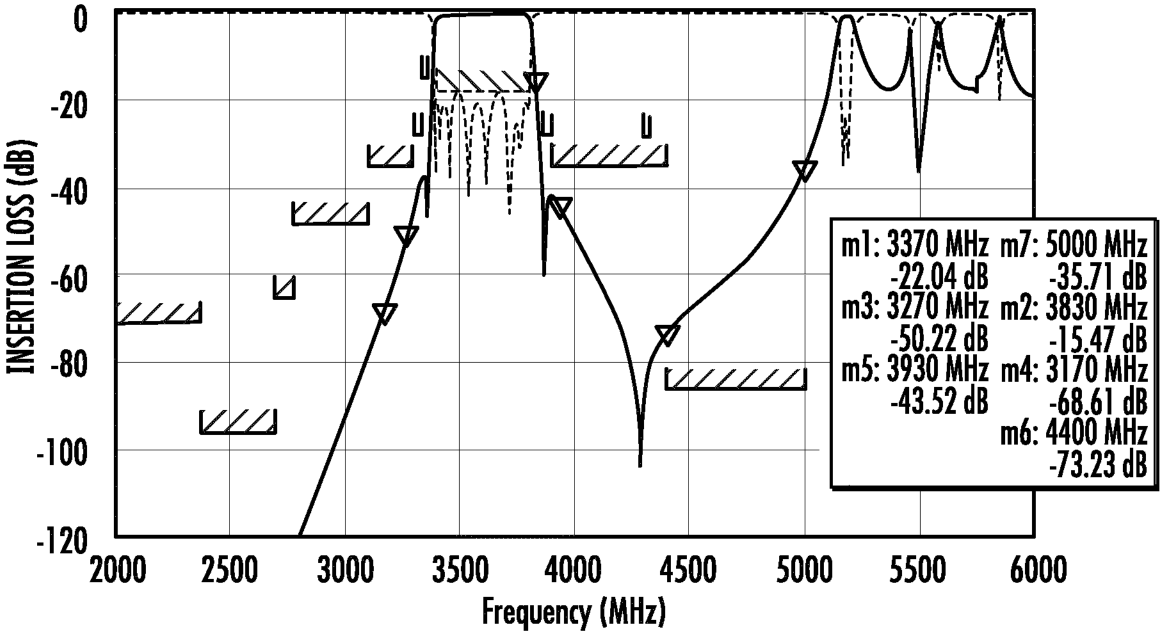
FIG. 19C is a graph of the insertion loss over a larger frequency range that shows the simulated out-of-band rejection performance of the filter of FIG. 18.

FIG. 18 is a perspective view of the filter according to the first design. The dimensions of the filter are 44.65 mm×12.6 mm×10.73 mm (without input and output connectors 102). The total volume (without connectors) is 6.04 mL. FIG. 19A is a graph of the simulated return loss for the first filter design. As shown in FIG. 19A, the return loss is greater than −18 dB throughout the entire 3.4-3.8 GHz pass band, with at least 4 MHz of margin on either side of the pass band. FIG. 19B is a graph of the simulated insertion loss for the first filter design. As shown the insertion loss is less than 1 dB across the full 3.4-3.8 GHz pass band. FIG. 19C is a graph of the insertion loss over a larger frequency range that shows the simulated out-of-band rejection performance of the first filter design. As shown, the out-of-band rejection is at least 35 dB at all frequencies between the pass band and 5 GHz. An additional low pass filter may be used to obtain the additional 50 dB in rejection that is necessary in this frequency range.

Figure 20:
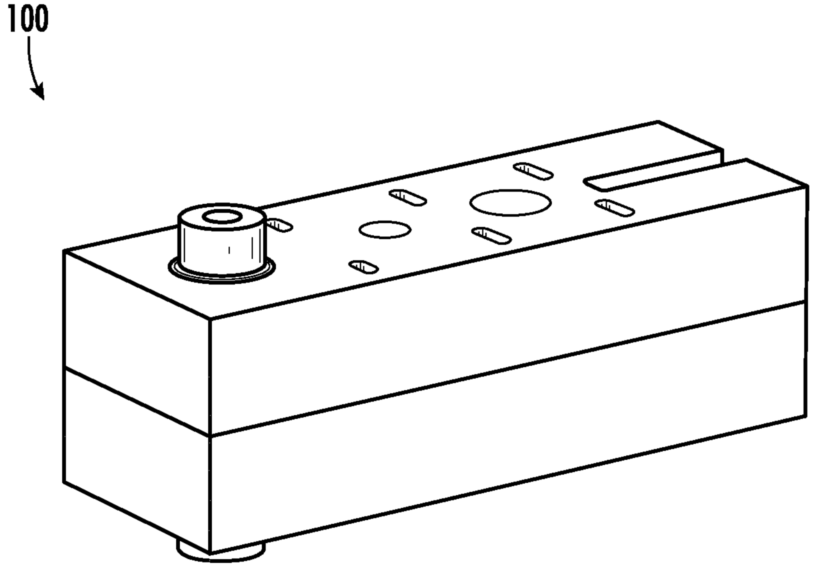
FIG. 20 is a perspective view of a filter according to further embodiments of the present invention.
Figure 21A:
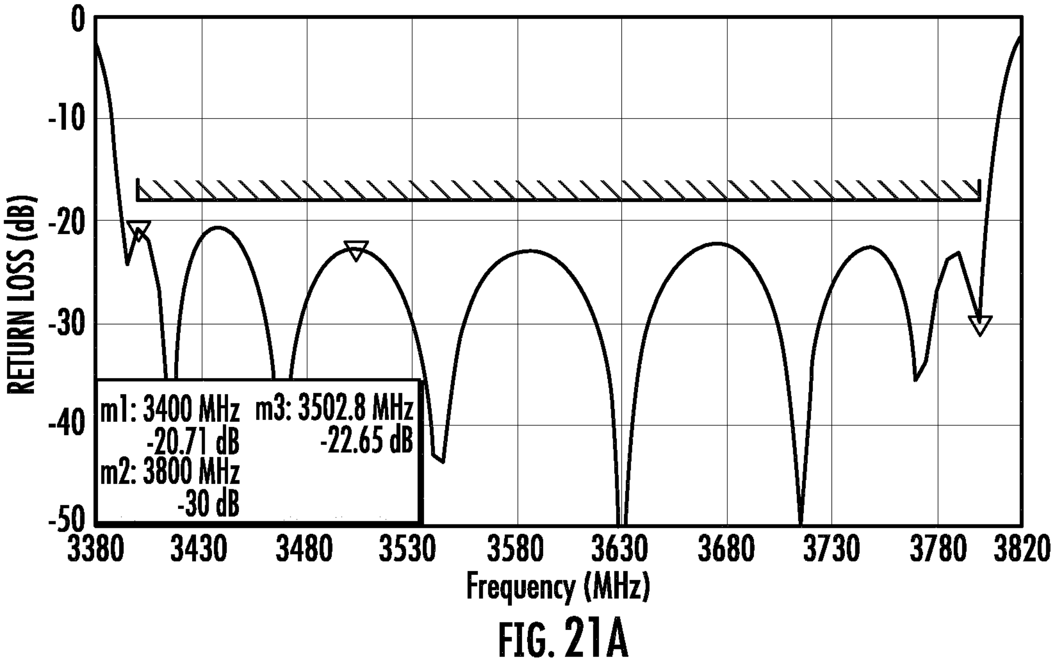
FIG. 21A is a graph of the simulated return loss for the filter of FIG. 20.
Figure 21B:
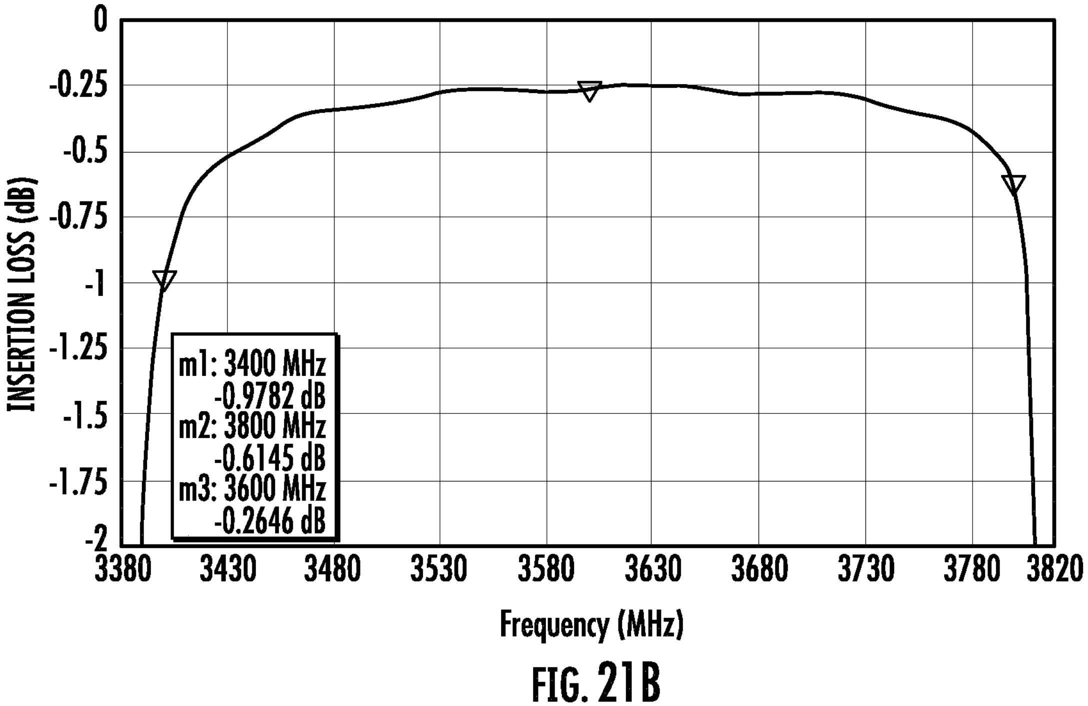
FIG. 21B is a graph of the simulated insertion loss for the filter of FIG. 20.
Figure 21C:
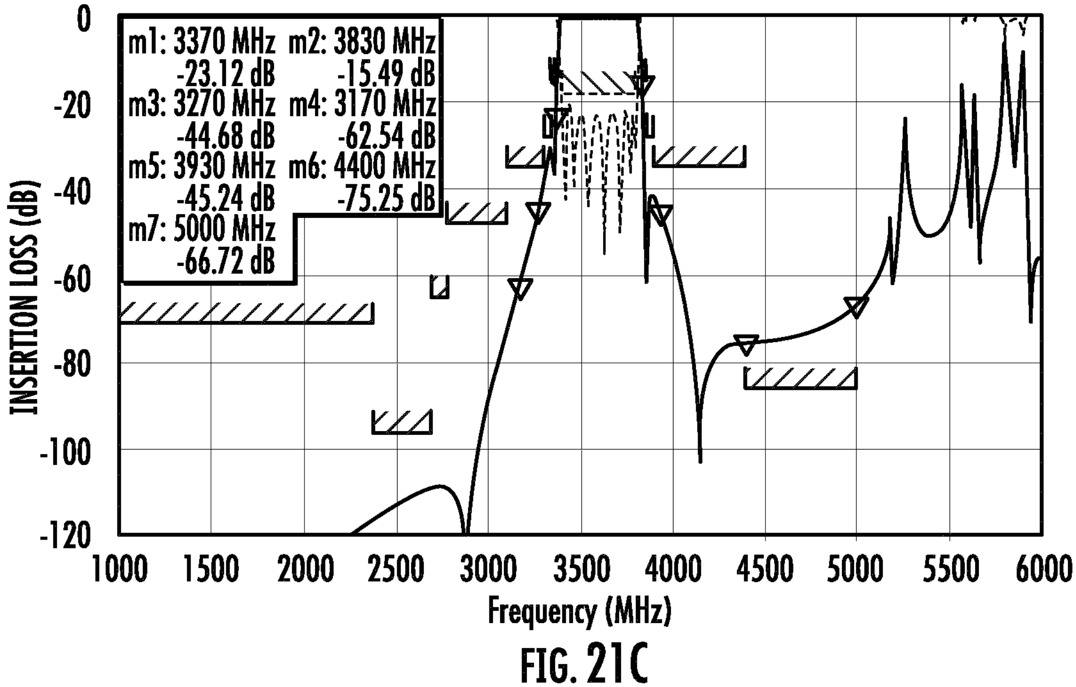
FIG. 21C is a graph of the insertion loss over a larger frequency range that shows the simulated out-of-band rejection performance of the filter of FIG. 20.

FIG. 20 is a perspective view of the filter according to the second design. This filter may be the filter 100 of FIGS. 5A-5C. The dimensions of the filter are 37.62 mm×13.0 mm×11.73 mm (without connectors). The total volume (without connectors) is 5.74 mL. FIG. 21A is a graph of the simulated return loss for the first filter design. As shown in FIG. 21A, the return loss is greater than −20 dB throughout the entire 3.4-3.8 GHz pass band, with at least 4 MHz of margin on either side of the pass band. This represents excellent return loss performance. FIG. 21B is a graph of the simulated insertion loss for the first filter design. As shown the insertion loss is less than 1 dB across the full 3.4-3.8 GHz pass band. FIG. 21C is a graph of the insertion loss over a larger frequency range that shows the simulated out-of-band rejection performance of the first filter design. As shown, the out-of-band rejection is at least 66 dB at all frequencies between the pass band and 5 GHz. An additional low pass filter may be used to obtain the additional 20 dB in rejection that is necessary in this frequency range, and to provide the necessary level of rejection at frequencies above 5 GHz. Thus, the metallized dielectric waveguide filter may exhibit a return loss of less than 15 dB across all of a 3.4-3.8 GHz band and exhibits out-of-band rejection of at least 50 dB in the 4.4-5.0 GHz band.

The filters according to embodiments of the present invention may, for example, be suitable for use in time division duplex adaptive antennas that operate in the 2.3-6 GHz frequency range.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A metallized dielectric waveguide filter, comprising:

an upper metallized dielectric waveguide having a plurality of upper resonant cavities that extend along a longitudinal axis, the upper metallized dielectric waveguide comprising an upper dielectric block having metallized outer walls;

a lower metallized dielectric waveguide having a plurality of lower resonant cavities, the lower metallized dielectric waveguide comprising a lower dielectric block having metallized outer walls, wherein a first of the upper resonant cavities is operatively connected to a first of the lower resonant cavities via at least one coupling window, and wherein a first longitudinally-extending slot having metallized walls is provided in a portion of the upper dielectric block that is part of the first of the upper resonant cavities.

2. The metallized dielectric waveguide filter of claim 1, wherein the first longitudinally-extending slot extends to a distal end of the first of the upper resonant cavities and has a depth that is less than a depth of the first of the upper resonant cavities.

3. The metallized dielectric waveguide filter of claim 1, wherein the upper metallized dielectric waveguide is mounted on the lower metallized dielectric waveguide to form a folded filter having a generally U-shaped main transmission path, and wherein the metallized dielectric waveguide filter includes a first cross-coupling between a second of the upper resonant cavities and a second of the lower resonant cavities.

4. The metallized dielectric waveguide filter of claim 3, further comprising a cross-coupling window that comprises an un-metallized portion of a bottom surface of the second of the upper resonant cavities and an un-metallized portion of a top surface of the second of the lower resonant cavities that at least partially overlaps with the un-metallized portion of the bottom surface of the second of the upper resonant cavities.

5. The metallized dielectric waveguide filter of claim 3, wherein a portion of the upper dielectric block that is part of the second of the upper resonant cavities includes a hole having metallized walls.

6. The metallized dielectric waveguide filter of claim 1, further comprising:

a first input/output port that is connected to a fourth of the upper resonant cavities;

a second input/output port that is connected to a fourth of the lower resonant cavities, wherein the first of the upper resonant cavities is the resonant cavity of the upper metallized dielectric waveguide that is farthest from the fourth of the upper resonant cavities.

7. The metallized dielectric waveguide filter of claim 1, wherein a second longitudinally-extending slot having metallized walls is formed in a portion of the lower dielectric block that is part of the first of the lower resonant cavities.

8. The metallized dielectric waveguide filter of claim 1, wherein the upper metallized dielectric waveguide and the lower metallized dielectric waveguide are identical.

9. The metallized dielectric waveguide filter of claim 1, wherein the at least one coupling window comprises a first coupling window that extends generally transversely across an interface between the first of the upper resonant cavities and the first of the lower resonant cavities, and second and third coupling windows that extend generally longitudinally at or near opposed side edges of the interface between the first of the upper resonant cavities and the first of the lower resonant cavities.

10. The metallized dielectric waveguide filter of claim 1, wherein the at least one coupling window comprises a first coupling window that extends generally transversely across a bottom surface of the first of the upper resonant cavities at or near a distal end of the first of the upper resonant cavities.

11. A metallized dielectric waveguide filter, comprising:

an upper metallized dielectric waveguide having a plurality of upper resonant cavities, the upper metallized dielectric waveguide comprising an upper dielectric block having metallized outer walls;

a lower metallized dielectric waveguide having a plurality of lower resonant cavities, the lower metallized dielectric waveguide comprising a lower dielectric block having metallized outer walls, wherein a first of the upper resonant cavities is operatively connected to a first of the lower resonant cavities via at least one coupling window, and wherein a first slot having metallized walls is provided in a portion of the upper dielectric block that is part of the first of the upper resonant cavities, wherein the upper metallized dielectric waveguide further comprises metallized vias that extend through the upper dielectric block to define the upper resonant cavities, and the lower metallized dielectric waveguide further comprises metallized vias that extend through the lower dielectric block to define the lower resonant cavities.

12. A metallized dielectric waveguide filter, comprising:

an upper metallized dielectric waveguide having a first upper resonant cavity, a last upper resonant cavity, and at least one intermediate upper resonant cavity that is positioned between the first upper resonant cavity and the last upper resonant cavity, the upper metallized dielectric waveguide comprising an upper dielectric block having metallized outer walls;

a lower metallized dielectric waveguide having a first lower resonant cavity, a last lower resonant cavity, and at least one intermediate lower resonant cavity that is positioned between the first lower resonant cavity and the last lower resonant cavity, the lower metallized dielectric waveguide comprising a lower dielectric block having metallized outer walls, wherein the last upper resonant cavity is operatively connected to the first lower resonant cavity via a first coupling window, a second coupling window and a third coupling window, and wherein the first coupling window extends generally transversely across an interface between the last upper resonant cavity and the first lower resonant cavity, and the second and third coupling windows extend generally longitudinally across the interface between the last upper resonant cavity and the first lower resonant cavity, and the first coupling window is the only coupling window that extends generally transversely across the interface between the last upper resonant cavity and the first lower resonant cavity.

13. The metallized dielectric waveguide filter of claim 12, wherein the first coupling window does not overlap with either the second coupling window or the third coupling window along any axis that extends parallel to a longitudinal axis of the metallized dielectric waveguide filter.

14. The metallized dielectric waveguide filter of claim 12, further comprising a first longitudinally-extending slot having metallized walls in a portion of the upper dielectric block that is part of the last upper resonant cavity.

15. The metallized dielectric waveguide filter of claim 12, wherein the upper metallized dielectric waveguide is mounted on the lower metallized dielectric waveguide to form a folded filter having a generally U-shaped main transmission path, and wherein the metallized dielectric waveguide filter includes a first cross-coupling between a first of the intermediate upper resonant cavities and a first of the intermediate lower resonant cavities.

16. The metallized dielectric waveguide filter of claim 12, wherein a portion of the upper dielectric block that is part of the first of the intermediate upper resonant cavities includes a hole having metallized walls.

17. The metallized dielectric waveguide filter of claim 12, wherein the upper metallized dielectric waveguide further comprises metallized vias that extend through the upper dielectric block to define the first upper resonant cavity, the last upper resonant cavity, and the at least one intermediate upper resonant cavity, and the lower metallized dielectric waveguide further comprises metallized vias that extend through the lower dielectric block to define the first lower resonant cavity, the last lower resonant cavity, and the at least one intermediate lower resonant cavity.

18. The metallized dielectric waveguide filter of claim 12, wherein the upper metallized dielectric waveguide and the lower metallized dielectric waveguide are identical.

19. The metallized dielectric waveguide filter of claim 12, wherein the first coupling window, the second coupling window and the third coupling window are provided on respective first, second and third sides of the interface between the last upper resonant cavity and the first lower resonant cavity and coupling windows are provided above and below a fourth side of the interface between the last upper resonant cavity and the first lower resonant cavity.

20. The metallized dielectric waveguide filter of claim 12, wherein a ratio between a height of the upper metallized dielectric waveguide and a width of the upper metallized dielectric waveguide is between 0.42 and 0.48.

* * * * *